US009656839B2

(12) United States Patent
Farquharson

(10) Patent No.: US 9,656,839 B2
(45) Date of Patent: May 23, 2017

(54) JACK AND SUPPORT DEVICE

(71) Applicant: Phillip Farquharson, Muswellbrook (AU)

(72) Inventor: Phillip Farquharson, Muswellbrook (AU)

( * ) Notice: Subject to any disclaimer, the term of this patent is extended or adjusted under 35 U.S.C. 154(b) by 0 days.

(21) Appl. No.: 14/391,980

(22) PCT Filed: Jul. 19, 2013

(86) PCT No.: PCT/AU2013/000803
§ 371 (c)(1),
(2) Date: Oct. 10, 2014

(87) PCT Pub. No.: WO2014/012149
PCT Pub. Date: Jan. 23, 2014

(65) Prior Publication Data

US 2015/0076432 A1 Mar. 19, 2015

(30) Foreign Application Priority Data

Jul. 20, 2012 (AU) ................................ 2012903110

(51) Int. Cl.
*B66F 3/25* (2006.01)
*B66F 3/24* (2006.01)
(Continued)

(52) U.S. Cl.
CPC .................. *B66F 3/24* (2013.01); *B66F 3/10* (2013.01); *B66F 3/247* (2013.01); *B66F 3/25* (2013.01);
(Continued)

(58) Field of Classification Search
CPC .... B66F 3/24; B66F 3/247; B66F 3/10; B66F 3/44; B66F 3/42
(Continued)

(56) References Cited

U.S. PATENT DOCUMENTS 1,593,217 A * 7/1926 Lucker ...................... B66F 3/10 254/1
2,153,888 A * 4/1939 Haferkorn ................. B66F 3/10 254/102
(Continued)

FOREIGN PATENT DOCUMENTS

CN 201065319 Y 5/2008
WO WO2008/104745 A1 2/2008

OTHER PUBLICATIONS

International Search Report for PCT/AU2013/000803 dated Aug. 29, 2013, six pages.
(Continued)

*Primary Examiner* — Larry E Waggle, Jr.
*Assistant Examiner* — Seahee Yoon
(74) *Attorney, Agent, or Firm* — Kilpatrick Townsend & Stockton LLP

(57) ABSTRACT

A jacking device for lifting and supporting earthmoving equipment or vehicles, the jacking device including: a base; a jacking leg mounted to the base, the jacking leg for lifting a load to an elevated position; a top plate mounted to the jacking leg, the top plate for engaging the load; and, a support member mounted directly or indirectly to the base, wherein the support member is positionable to engage the top plate and thereby provide additional support to the load in the elevated position.

14 Claims, 35 Drawing Sheets

(51) Int. Cl.
*B66F 3/44* (2006.01)
*B66F 3/10* (2006.01)
*B66F 3/42* (2006.01)
*B66F 5/04* (2006.01)

(52) U.S. Cl.
CPC *B66F 3/44* (2013.01); *B66F 3/42* (2013.01); *B66F 5/04* (2013.01)

(58) Field of Classification Search
USPC .................... 254/93 A, 93 R, 93 H, 2 B, 8 B
See application file for complete search history.

(56) References Cited

U.S. PATENT DOCUMENTS 3,622,124 A * 11/1971 Sidles ....................... B66F 3/42 254/3 R
4,174,095 A * 11/1979 Chipman .................... 254/93 H
4,240,334 A * 12/1980 Crosser ................. F15B 15/261 92/114
4,629,163 A * 12/1986 Miller ..................... B66F 13/00 254/100
4,641,815 A * 2/1987 Yu ............................. B66F 3/42 254/93 H
5,000,424 A * 3/1991 Inoue ........................ B66F 5/04 254/93 H
5,123,629 A * 6/1992 Takeuchi .................. B66F 3/10 254/100
5,553,825 A * 9/1996 Rasmussen ............... B60S 9/04 248/354.3
6,659,428 B2 * 12/2003 Kubota ..................... B66F 3/10 254/100
2007/0051933 A1 * 3/2007 Rincoe ...................... B60S 9/08 254/425

OTHER PUBLICATIONS

Written Opinion of the International Preliminary Examining Authority for PCT/AU2013/000803 dated Aug. 29, 2013, seven pages.
International Preliminary Report on Patentability for PCT/AU2013/000803 dated Aug. 29, 2013, six pages.

* cited by examiner

Section F-F Rotated 135°

E - E

Section A-A Rotated 45°

A-A

JACK AND SUPPORT DEVICE

FIELD OF THE INVENTION

The present invention relates to jacking or lifting devices and, in particular but not limited to, jacking or lifting devices for the maintenance of mining and earthmoving equipment or vehicles.

BACKGROUND OF THE INVENTION

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Within the mining and construction industry, it is generally accepted that there are safety risks involved with working near to jacked or elevated machinery. Typically, repair or maintenance is only permitted under an elevated load if the load is adequately supported.

Presently there are several methods to elevate machinery for maintenance. For example, equipment/vehicles may jacked up using in-built hydraulic systems, by using external hydraulic jacking cylinders in combination with supporting stands, or, by using a combination product that performs both the functions of jacking the load and supporting the load.

Although combination jack and support products are efficient and reduce the amount of equipment required, these products are typically large and very heavy. Furthermore the support heights are limited, in particular by the increments at which the support are lockable. This leads to support height limitations and inaccuracy. For example, it is not unusual for conventional combination jack and support stands to have support height increments of 35 mm. In addition, typical combination products have many moving parts which are prone to fatigue or damage.

The present invention seeks to address the disadvantages associated with the above mentioned jacking methods/products. In particular the present invention seeks to provide a combination jack and support device that allows accurate elevation of machinery such that maintenance and repair may be carried out in a safe, efficient and timely manner.

SUMMARY OF INVENTION

In one broad form, the present invention provides, a jacking device for lifting and supporting earthmoving equipment or vehicles, the jacking device including: a base; a jacking leg mounted to the base, the jacking leg for lifting a load to an elevated position; a top plate mounted to the jacking leg, the top plate for engaging the load; and, a support member mounted directly or indirectly to the base, wherein the support member is positionable to engage the top plate and thereby provide additional support to the load in the elevated position.

In one form, the support member is a cylindrical support sleeve threadably mounted to the jacking leg.

In a further form, the jacking leg includes a hydraulic cylinder.

In one form, the barrel of the hydraulic cylinder is mounted to the base.

In another form, the inner surface of the cylindrical support sleeve is threadably mounted to the outer surface of the barrel.

In another form, the outer surface of the cylindrical support sleeve is splined.

In one form, the jacking device further includes, an outer sleeve mounted to the base.

In one form, the jacking device further includes a motor configured to rotate the cylindrical support sleeve and therefore move the cylindrical support sleeve with respect to the jacking leg.

In a further form, a motor and associated worm gear are attached to the outer sleeve.

In one form, the worm gear is positioned to engage the splined outer surface of the annular sleeve such that the motor operates to rotate the cylindrical support sleeve.

In a further form, the jacking device further includes an outer sleeve rotatably mounted the base.

In one form, the internal surface of the rotatably mounted outer sleeve is configured to engage the splined outer surface of the cylindrical sleeve.

In another form, the rotatably mounted outer sleeve includes a ring gear around its circumference.

In one form, the jacking device further includes a motor and associated worm gear attached to the base.

In another form, the worm gear is positioned to engage the ring gear and the motor operates to rotate the rotatably mounted outer sleeve, which in turn rotates the cylindrical support sleeve.

In one form, the jacking leg is movable between a retracted position and an extended position, wherein, in the extended position, the support member is positionable to engage the top plate and lock in position such that the jacking leg is maintained in the extended position.

In another form, the jacking device further including a substantially annular seat member, the annular seat member configured to rotatingly engage the jacking leg, and the support member resting on the annular seat member such that rotation of the annular seat member, moves the support member with respect to the jacking leg.

In one form, the jacking leg includes a hydraulic cylinder, and the annular seat member is rotatingly engaged to the barrel of the hydraulic cylinder.

In one form, the support member is a cylindrical support sleeve.

In a further form, the annular seat member is a nut.

In another form, the support member is formed of rotatingly engaged concentric inner and outer cylindrical members, the inner cylindrical member configured to rotatingly engage the jacking leg such that rotation of the inner cylindrical member with respect to the jacking leg moves the support member with respect to the jacking leg without the need for rotation of the outer cylindrical member with respect to the jacking leg.

In another form, the jacking leg includes a hydraulic cylinder and the inner cylindrical member is rotatably engaged to the barrel of the hydraulic cylinder.

BRIEF DESCRIPTION OF THE DRAWINGS

This invention may be better understood with reference to the illustrations of embodiments of the invention in which:—

DETAILED DESCRIPTION

Figure 1:
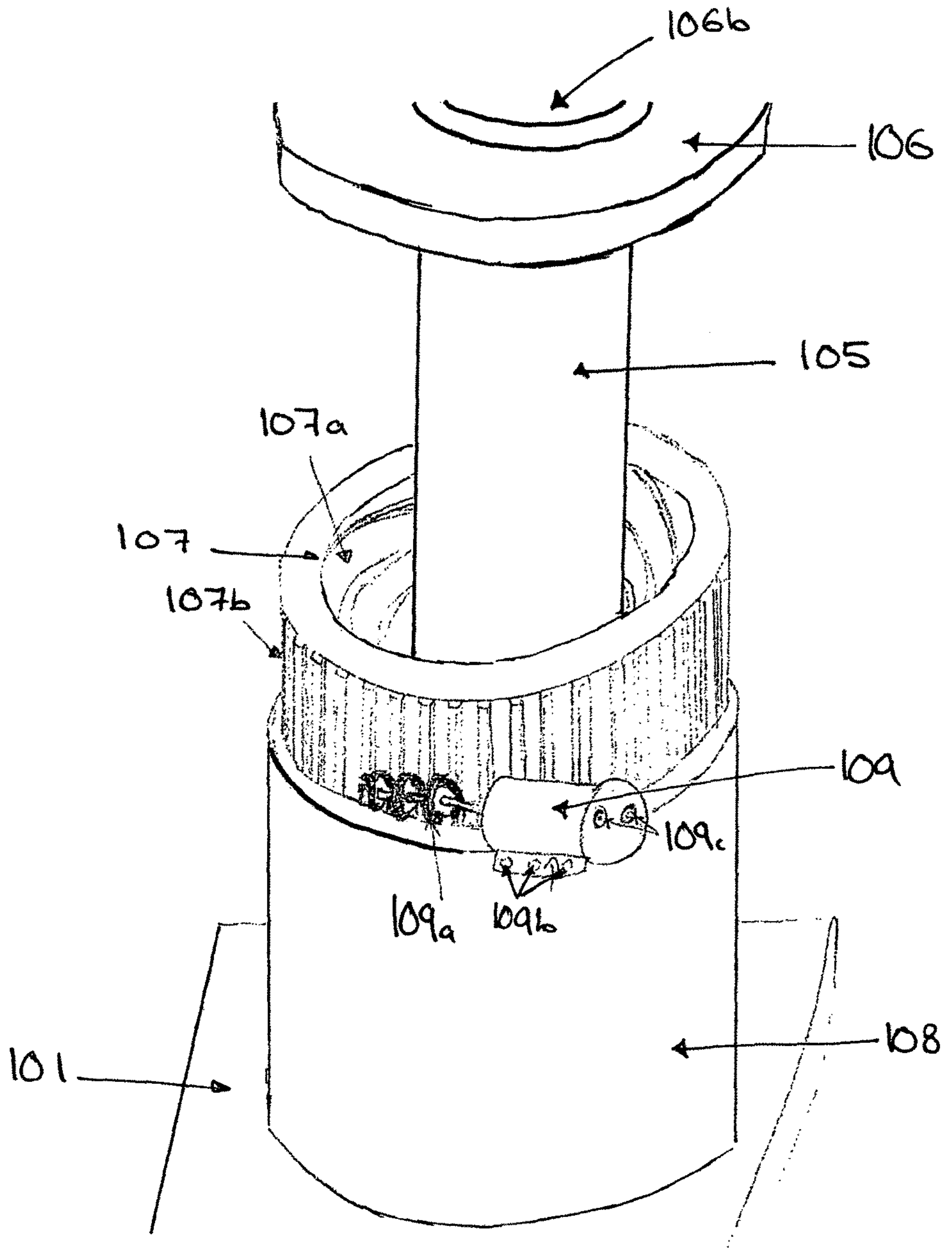
FIG. 1 shows a perspective view of an embodiment of the jacking device having a fixed outer sleeve.

Embodiments of the present invention provide a jacking device for lifting and supporting earthmoving equipment or vehicles. The jacking device typically includes a base and a jacking leg mounted to the base. The jacking leg is for lifting a load to an elevated position. A top plate for engaging the load is typically mounted to the jacking leg. Also included is a support member mounted directly or indirectly to the base, wherein the support member is positionable to engage the top plate and thereby provide additional support to the load in the elevated position.

For example the support member may be a cylindrical support sleeve encircling the jacking leg and threadably engaged to a base portion of the jacking leg. Once the jacking leg is extended, and top plate elevated (typically via a hydraulic cylinder), the cylindrical support sleeve is rotated such that it extends from the base of the jacking leg until it contacts the underside of the top plate and is locked in position. The support sleeve, through contact with the base, thereby provides additional support to the top plate and load, and relieves some of the load on the cylinder (or other lifting mechanism). It will be appreciated that in this instance the diameter of the top plate is typically greater than that of the cylindrical support sleeve.

In accordance with one particular embodiment (as shown in the figures), the jacking device includes a dual acting hydraulic cylinder mounted to a base plate (101). The hydraulic cylinder includes typical components such as piston (104), rod (105) and barrel (102). A barrel cap (103) seals the rod end of the barrel (102) and guides the rod (105) as it moves in and out of the barrel (102). The piston (104) sits within the barrel (102) and is bolted to the rod (105). In line with typical hydraulic cylinder function, the piston (104) moves up or down in relation to oil pressure to thereby drive the rod (105). It will be appreciated that the cylinder may be single or double acting.

A top plate (106) is mounted to the end of the rod (105) opposite the piston end. It is the top plate (106) that engages the vehicle/equipment or other load to be lifted. The top plate (106) may be configured to receive additional contact plates (not shown) each with specific engagement means that correspond to a specific load. For example, different loads (types of vehicles etc.) may have different mount points or arrangements. In some forms, the top plate may also be mounted to the rod such that it is pivotable.

Figure 3:
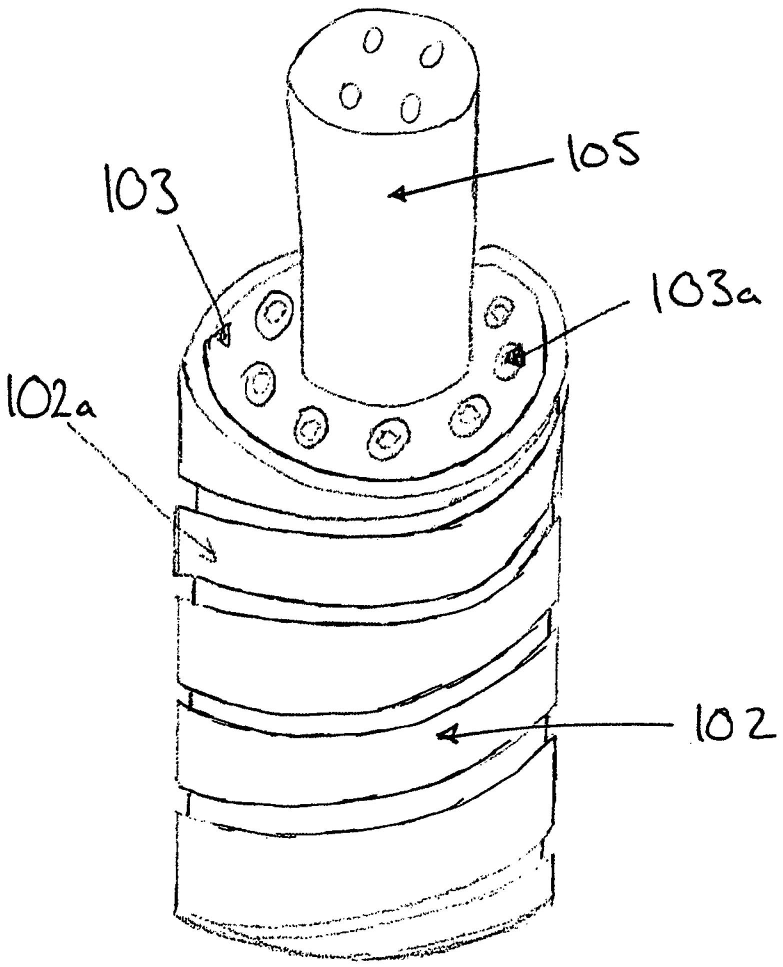
FIG. 3 shows a perspective view of an example of a hydraulic cylinder which may be used in the jacking device, in particular showing external threading on the barrel.
Figure 4:
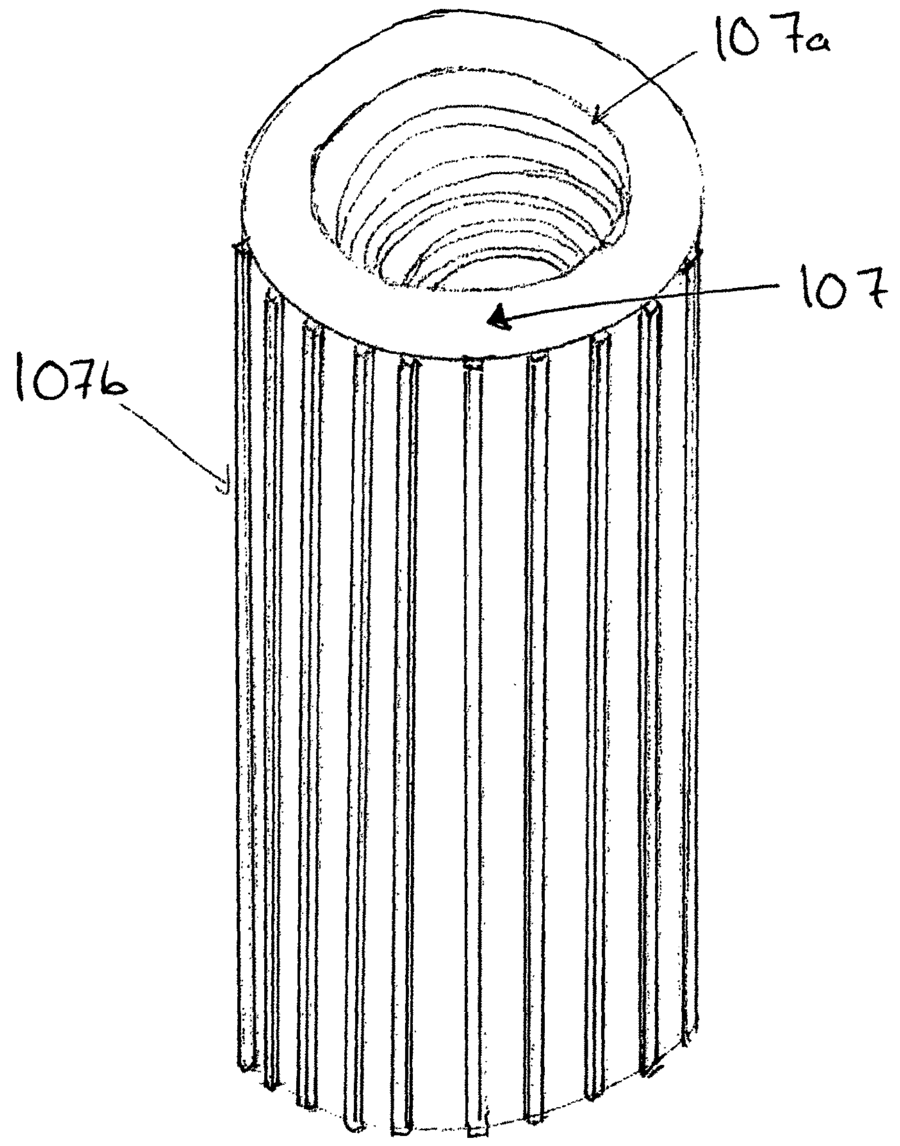
FIG. 4 shows a perspective view of an example of a support sleeve.
Figure 5:
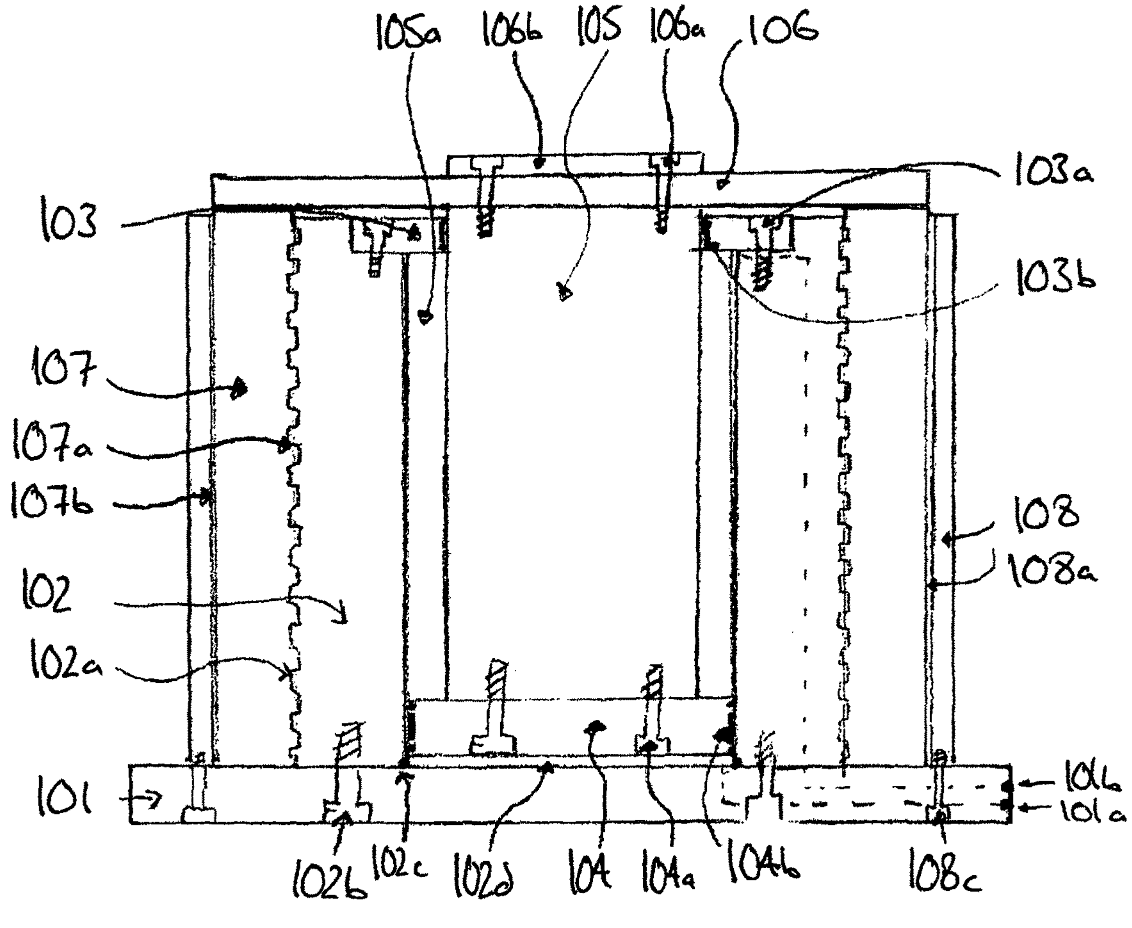
FIG. 5 shows a cross sectional view of jacking device of FIG. 1 in the retracted position.
Figure 6:
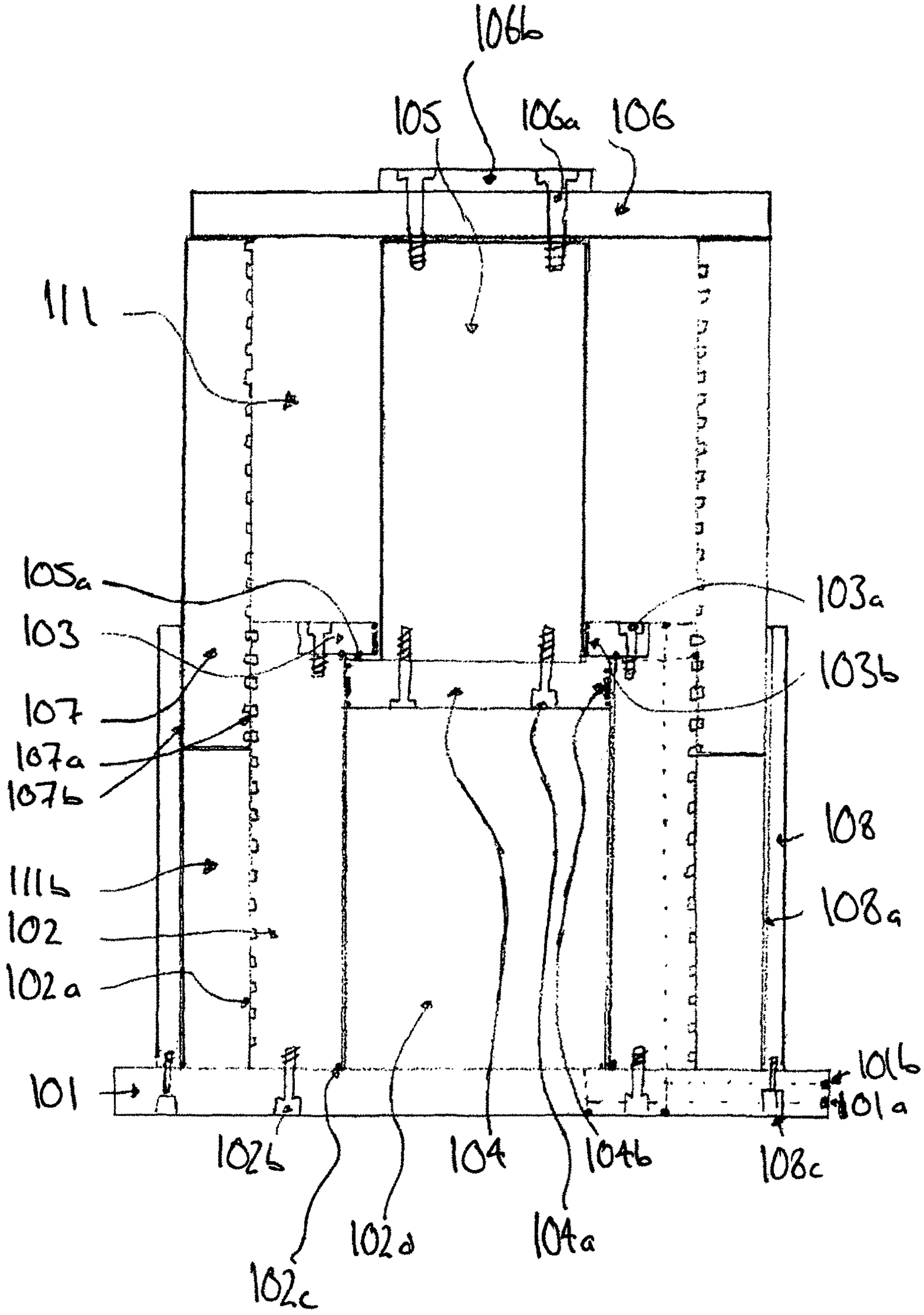
FIG. 6 shows a cross sectional view of the jacking device of FIG. 1 in an extended position.

As shown in FIG. 3, the outside surface of the cylinder barrel (102) has a spiral cut or thread machined into it such that it may engage a cylindrical support sleeve (107) having a corresponding spiral or thread on its internal surface. The cylindrical support sleeve (107) works in cooperation with the barrel to operate as a support stand for the load. As the support sleeve (107) is rotated, it travels up or down relative to the barrel (102). By positioning the support sleeve such that it engages the top plate, and thereafter locking it in position to stop counter rotation, additional support is provided to the load.

The underside of the top plate may be specifically configured or machined to receive the support sleeve (107). This may help to ensure correct positioning of the support sleeve (107) in contact with the top plate, (106) and may encourage even distribution of load from top plate (106) to support sleeve (107).

Typically the support sleeve (in combination with the barrel) is only used to hold the weight of the machine or component in a static position as a stand. The support sleeve (107) is typically not designed to lift or lower the load dynamically, but may assist. Having the support sleeve external to the cylinder allows visual inspection to confirm the support sleeve (107) is in contact with the top plate.

In some forms, the threading engagement between the support sleeve and the barrel may have a pitch or angle that is gradual such that the support sleeve will not rotate (e.g. unwind) without an external driving force. Under load this form would maintain a desired height and provide support to the top plate without necessarily needing a locking mechanism. It will also be appreciated that in some embodiments the pitch is such that it allows movements (extensions/retractions to adjust height) of as little as 1 mm.

In an alternate form, the barrel (102) itself may not include external threading, and instead, may be configured to receive an intermediate sleeve (not shown) which includes the appropriate spiral cut/thread machined on its outer surface.

In a further alternate form, the external machining may be a half moon so as to house a set of ball bearings that would mate with the internal surface of the support sleeve. The ball bearing arrangement may reduce rotation friction. It will further be appreciated that the threading of the support sleeve and/or barrel and/or any intermediary sleeves may be ACME, trapezoidal or other appropriate engagements that allow appropriate rotation.

As shown FIG. 1, an external sleeve (108), having both inside and outside surfaces cylindrically machined, is mounted to the base plate and surrounds the cylindrical support sleeve (107). The cylindrical support sleeve (107) includes a vertical splines (107*b*) on its outside surface. A rotation motor (109) including a worm gear/wheel arrangement (109*a*) is mounted to the top rim of the external sleeve (108). The worm gear/wheel arrangement (109*a*) operates to engage and rotate the support sleeve (107) via spline (107*b*) such that the sleeve rotates when the motor is operated.

Figure 2:
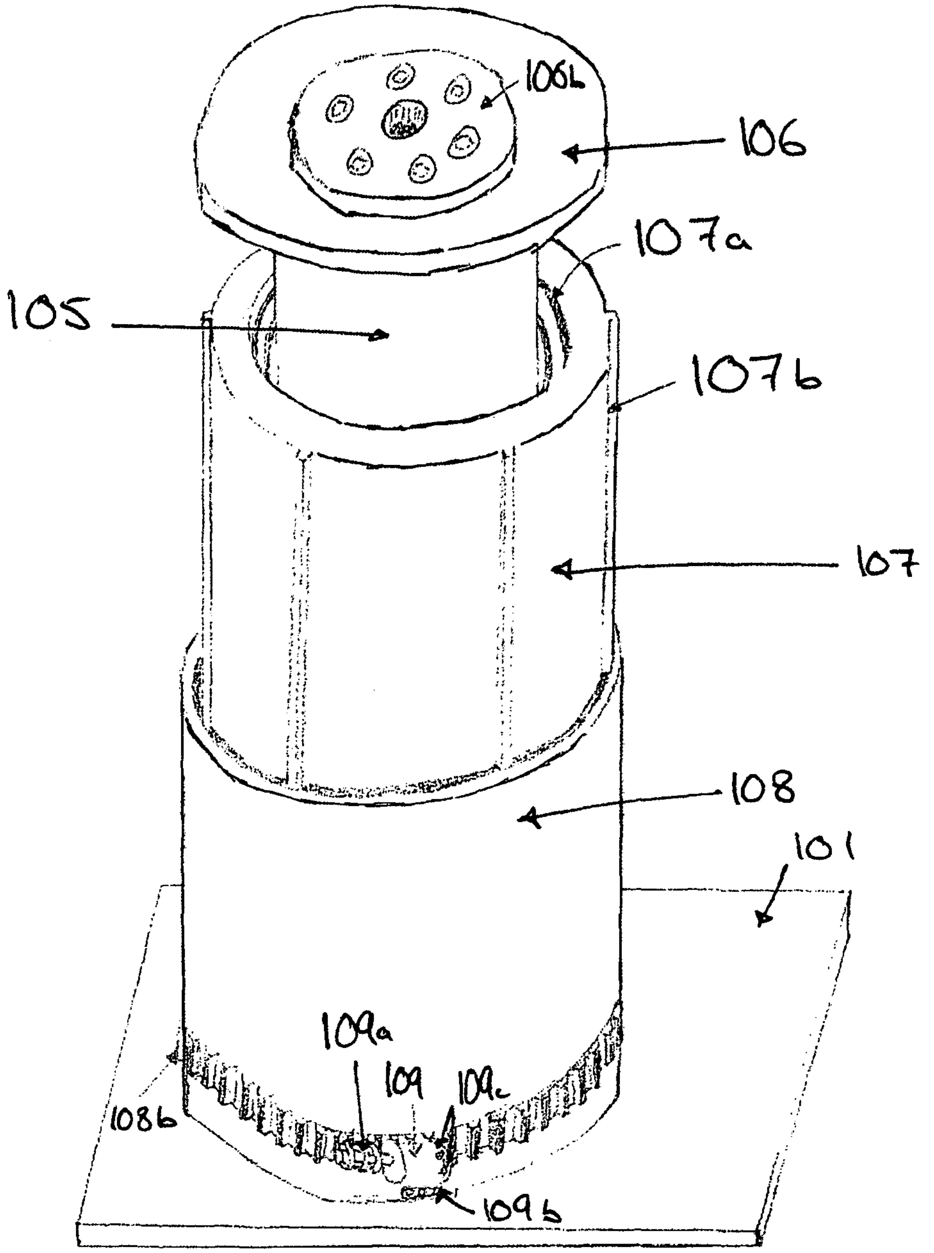
FIG. 2 shows a perspective view of an embodiment of the jacking device having a rotatable outer sleeve.

An alternate arrangement is shown in FIG. 2, wherein the external sleeve (108) is not fixed to the base plate (101) but rather permitted to rotate on the base plate (101). In this embodiment the external sleeve (108) includes an internal spline/thread to correspond with the external spline of the support sleeve (107). Additionally, on its outer surface, the external sleeve (108) includes ring gear (108*b*). The ring gear (108*b*) engages the worm gear of the rotation motor which, in this embodiment, is mounted to the base. The motor operates to rotate the outer sleeve (108) (via worm gear) which in turn rotates the annular support sleeve (107).

In either embodiment, support sleeve (107) is easily rotated whilst keeping the rotation components attached to a solid base with components easily accessible. The support sleeve (107) has the ability to move from fully retracted (substantially surrounding the barrel) to almost fully extended (extending from the barrel), and is able to lock in position such that it can operate as a support stand (in combination with the barrel) with increments of around 1 mm.

It will be appreciated that in other forms the rotation motor may interact with the cylindrical support sleeve (107) or external sleeve (108) by means other than a worm gear/spline arrangement. The support sleeve and external sleeve may also be suitably modified to interact with the motor (e.g. using methods other than a spline or ring gear). The rotation motor (109) may be hydraulic, pneumatic or electric. The gears may be guarded to prevent contact whilst rotating. The rotation motor is typically operated by the operator or Programmable Logic Control (PLC) and may have load lock valves and/or a rotation brake.

Typically in operation, the piston and rod raises via hydraulic pressure, lifting the load, the support sleeve rotates and travels upward or downward via the spiral or thread in relation to the cylinder barrel. When oil enters cavity at barrel end of the cylinder (102*d*) under pressure, the piston (104) and rod (105) as well as top plate (106) raises lifting the load, oil is also fed to the rotating motor (109) which rotates the support sleeve (107) and it travels upward via the spiral or thread on the outside of the cylinder barrel (102) following the top plate. Once the desired height is achieved, oil flow to cavity (102*d*) stops, and the support sleeve is elevated to make contact with the top plate (106). The support sleeve (107) is then locked in place by hydraulically locking and/or breaking the motor (109).

Figure 8A:
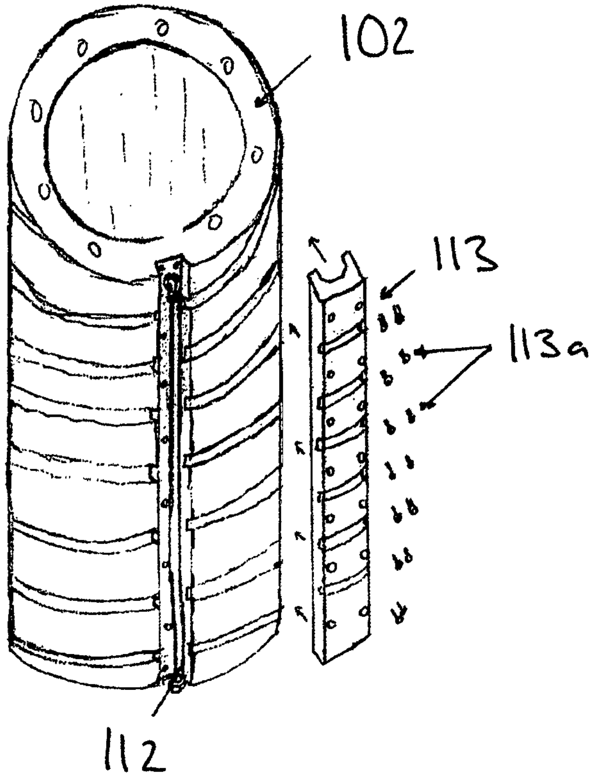
FIG. 8*a* shows a perspective view of an embodiment of the barrel having external oil pipe.
Figure 8B:
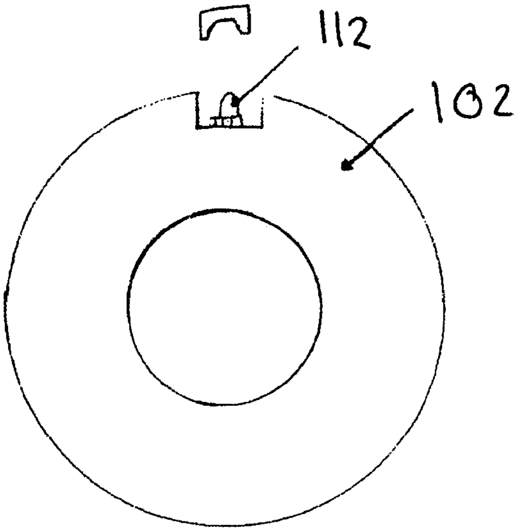
FIG. 8*b* shows a top view of the barrel of FIG. 8*a;*
Figure 9:
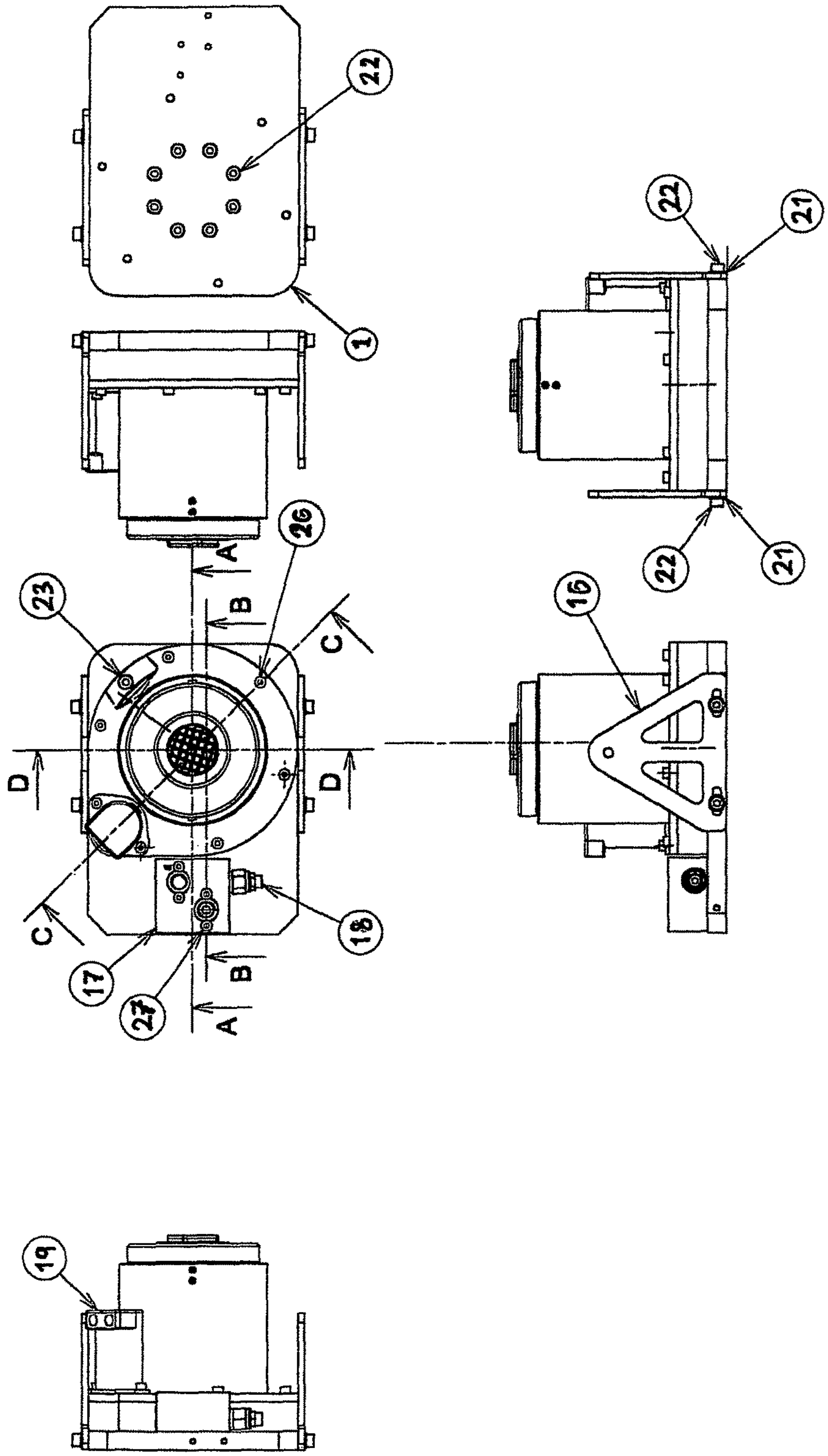
FIGS. 9 to 13 show one embodiment of a jacking device according to the invention.
Figure 10:
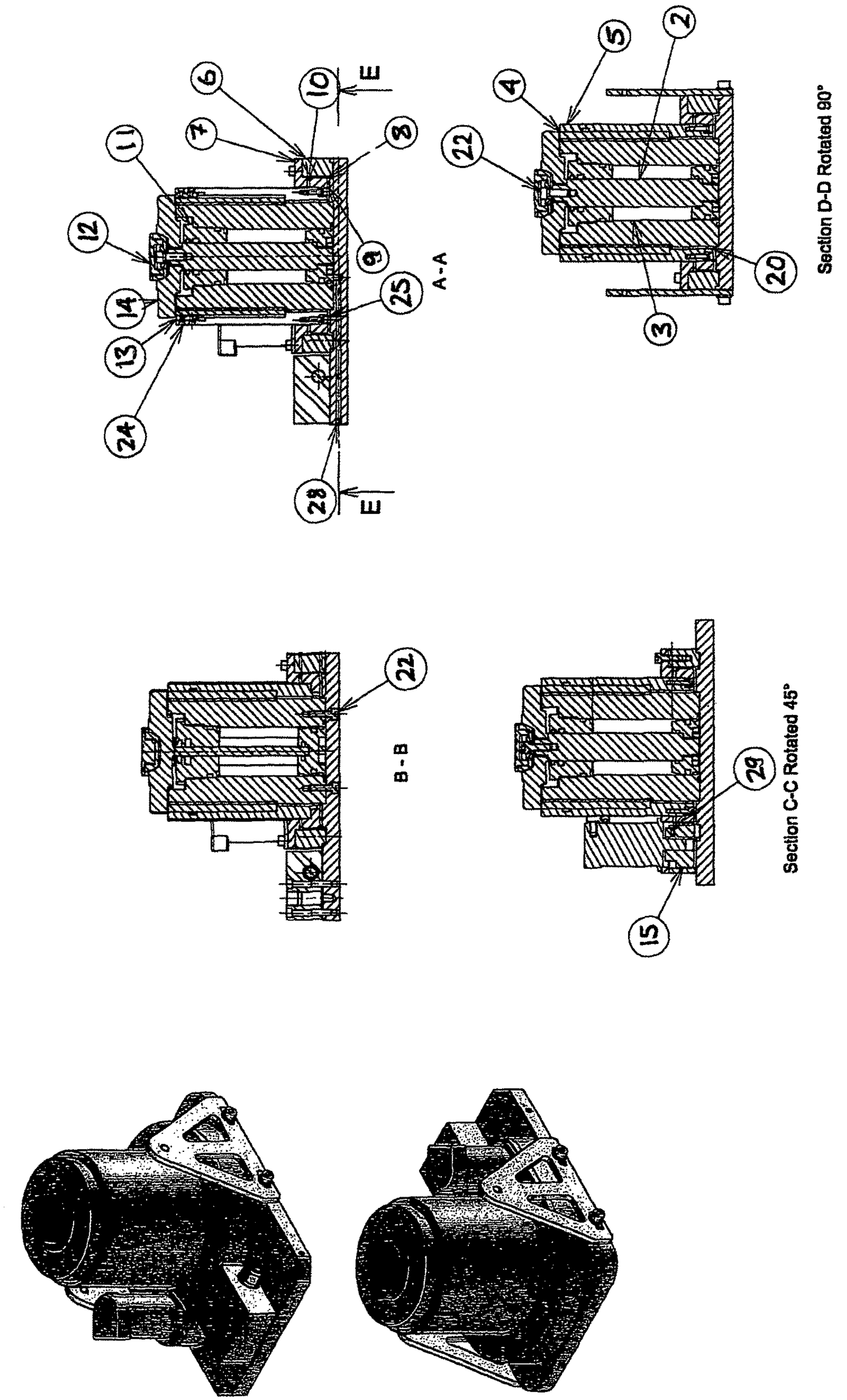
Figure 11:
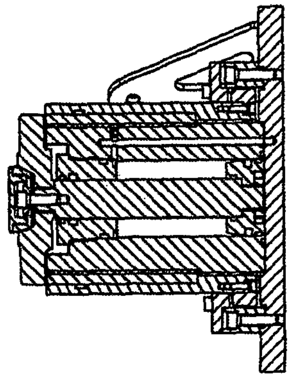
Figure 11:
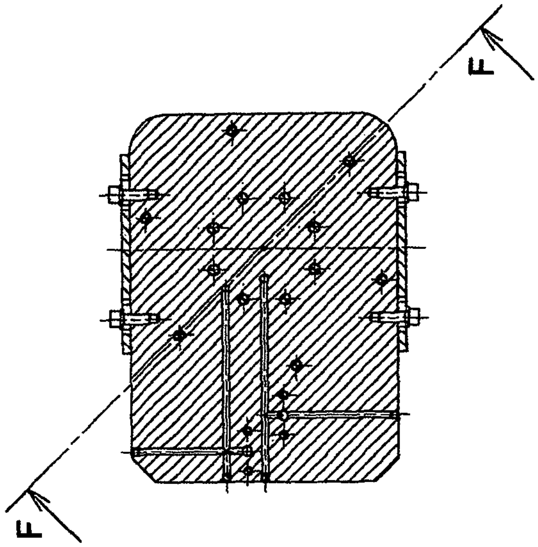
Figure 12:
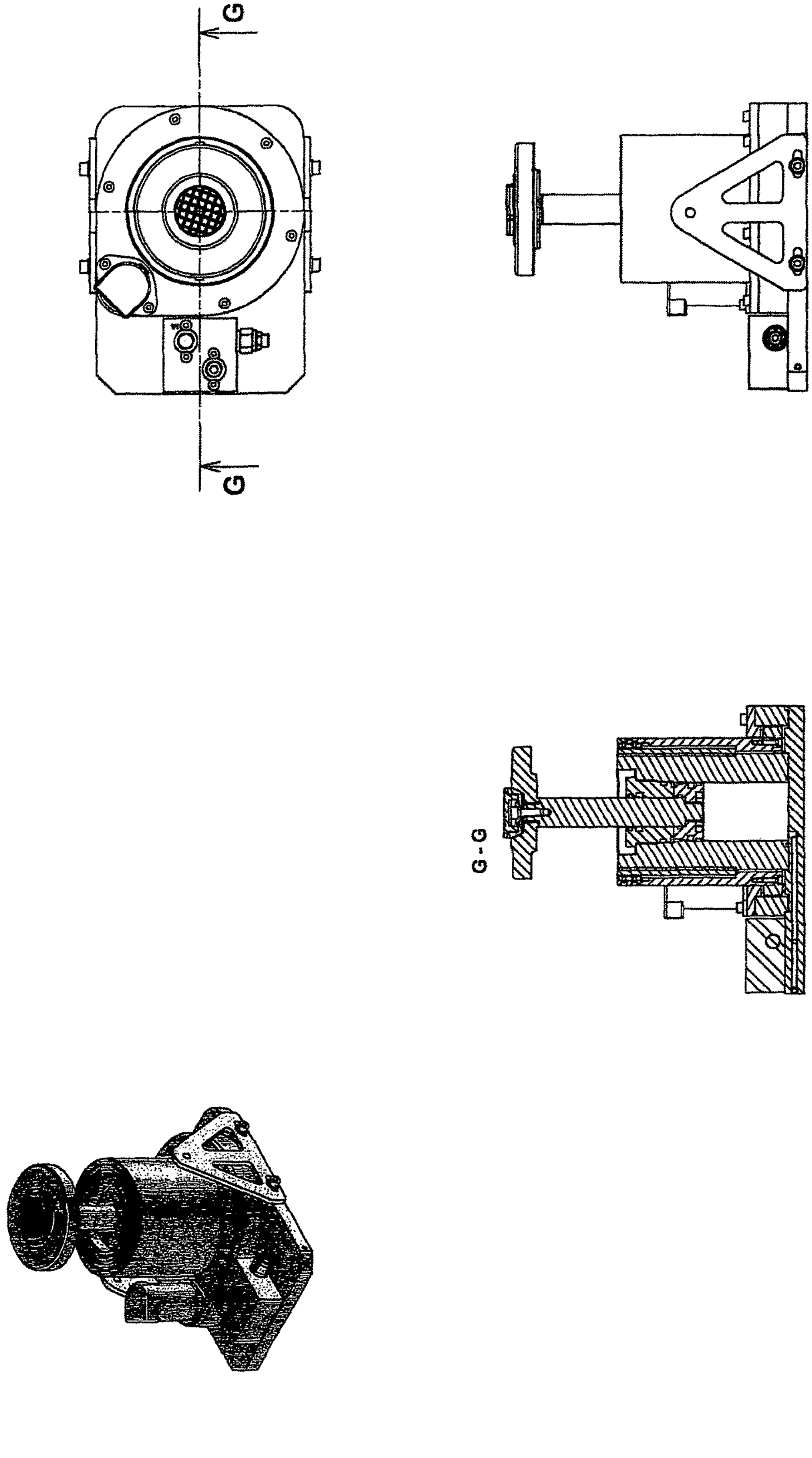
Figure 13:
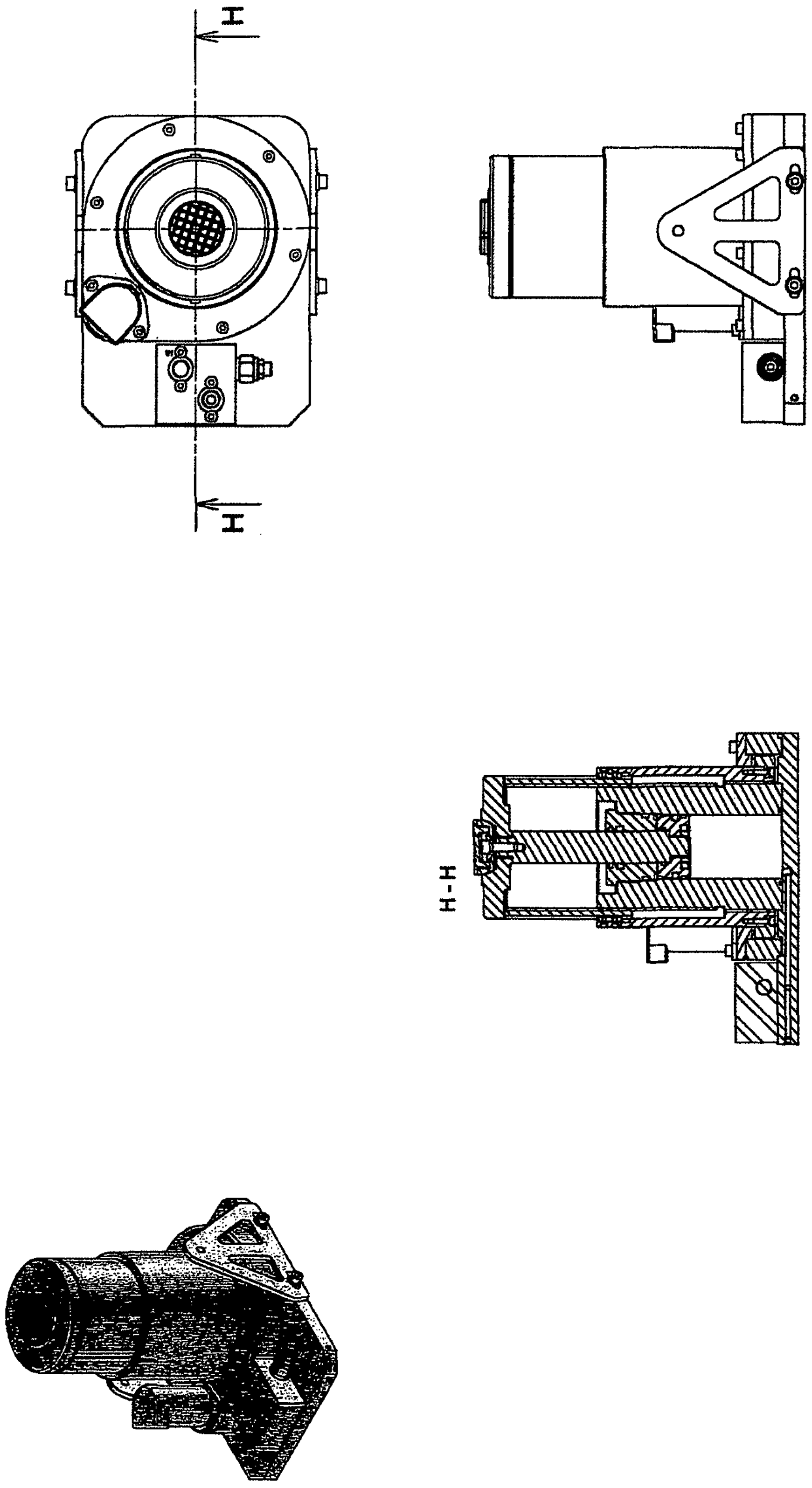
Figure 14:
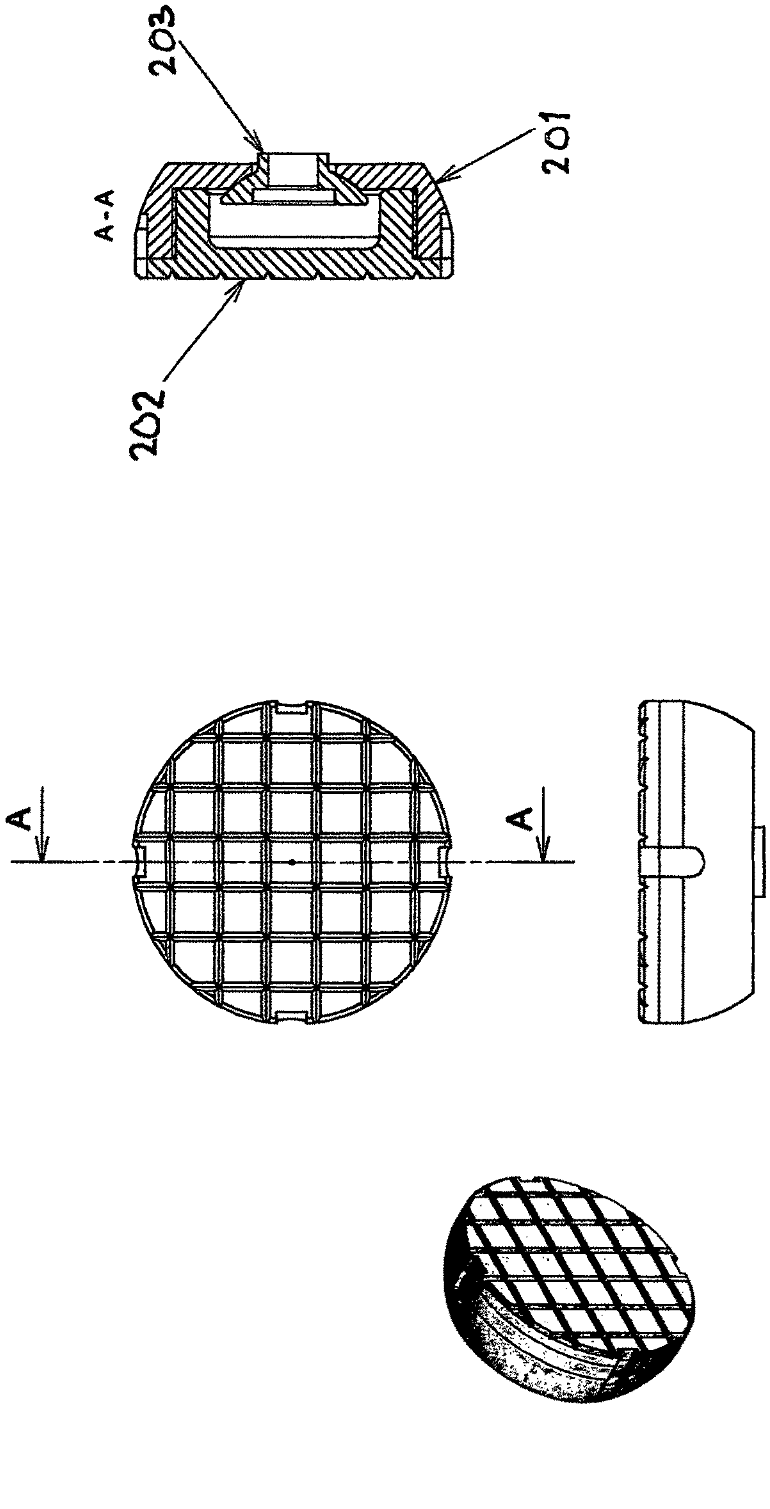
FIG. 14 shows perspective and cross sectional views of a top plate pivot sub assembly for the embodiment as shown in FIGS. 9 to 13.
Figure 15:
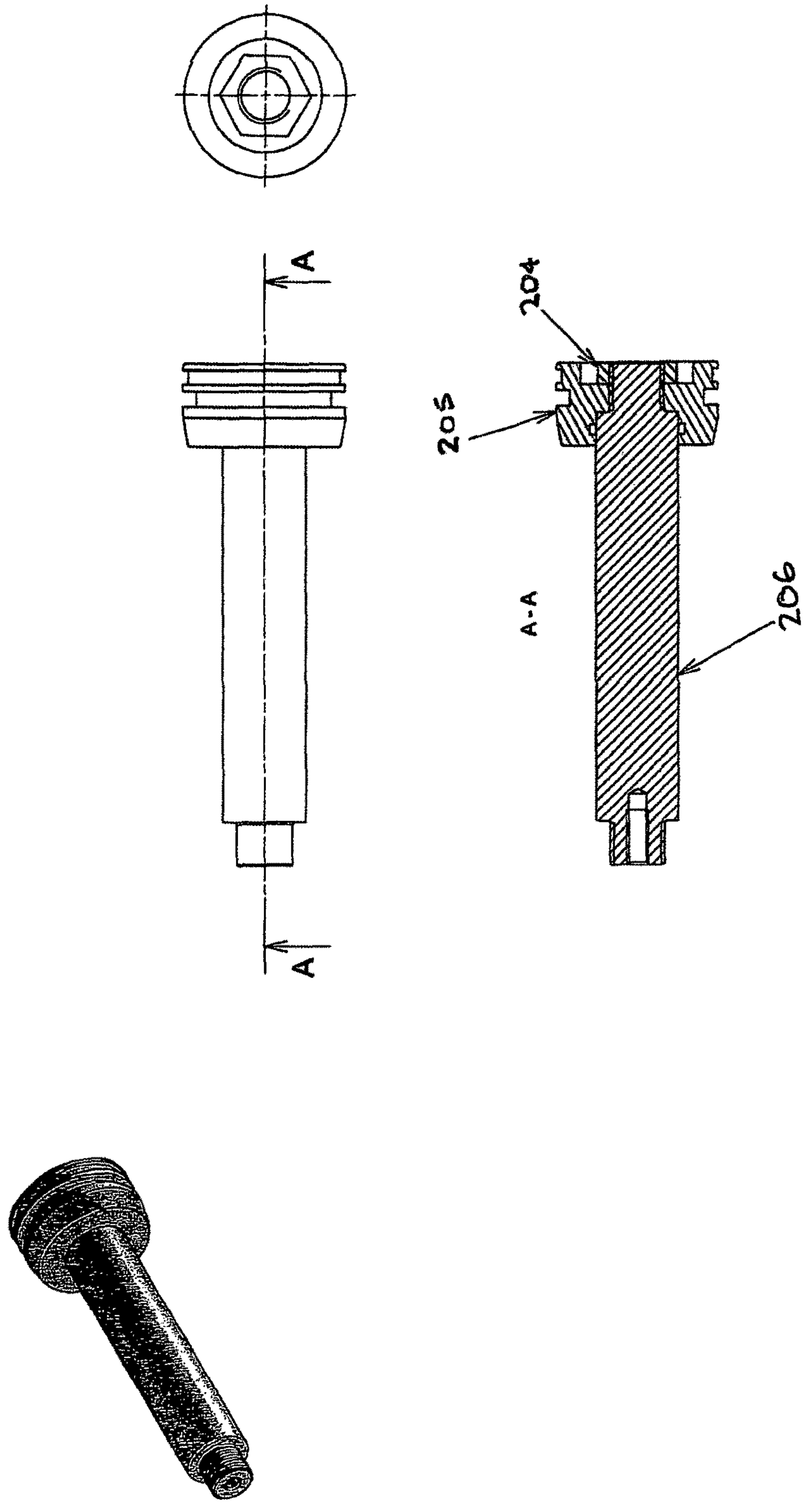
FIG. 15 shows perspective and cross sectional views of a piston rod sub assembly for the embodiment as shown in FIGS. 9 to 13.
Figure 16:
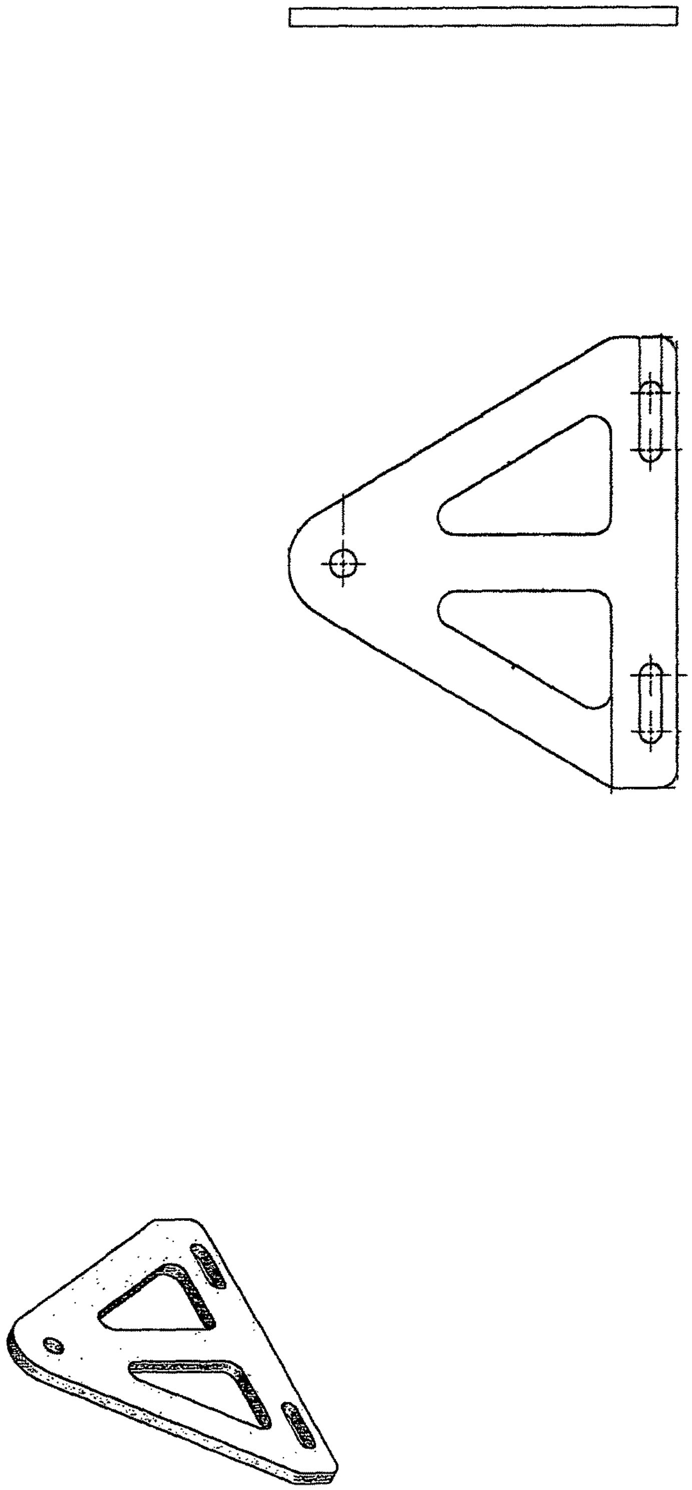
FIG. 16, shows perspective and cross sectional views of a jack lifting plate for the embodiment as shown in FIGS. 9 to 13.
Figure 17:
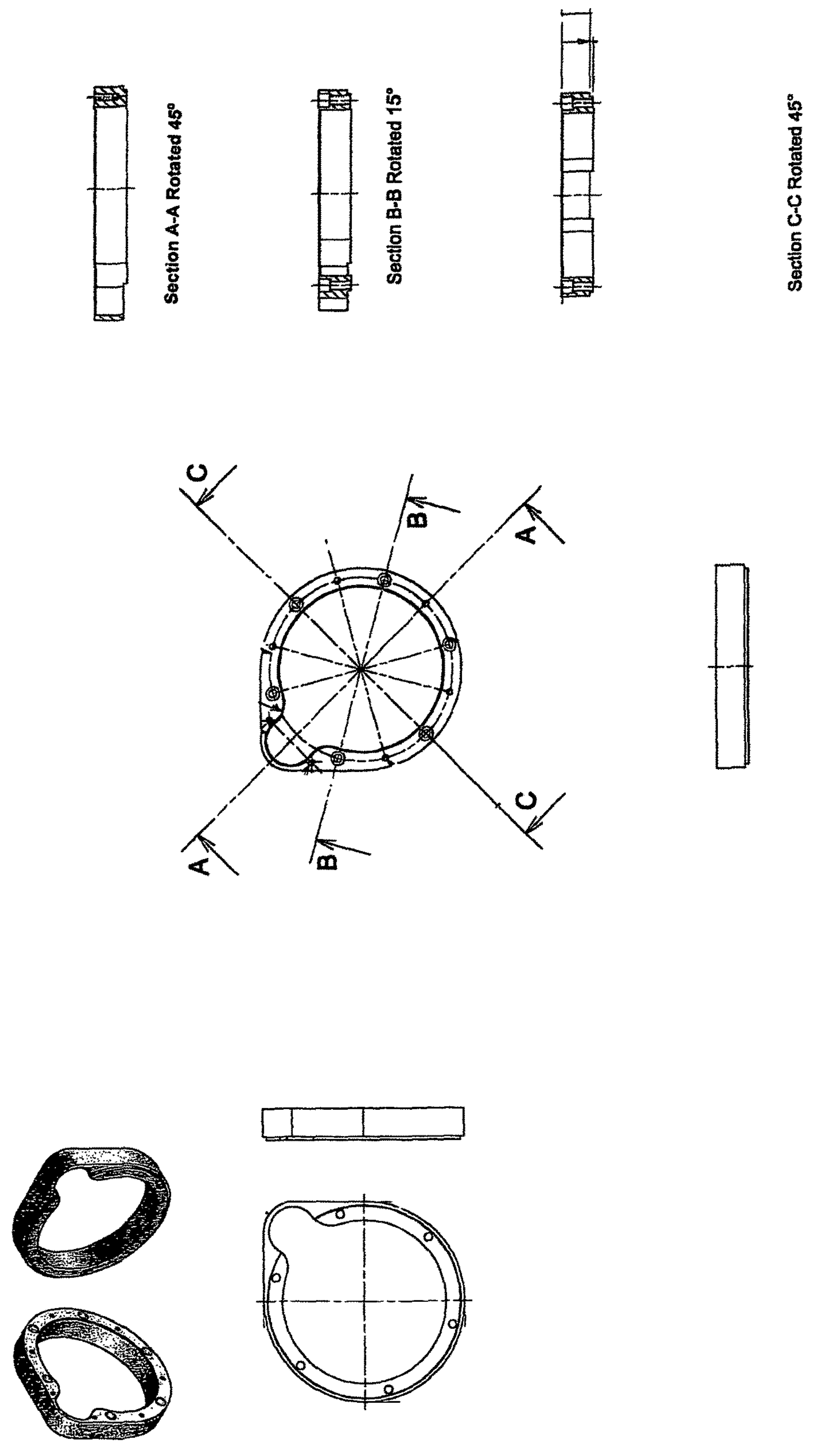
FIG. 17 shows perspective and cross sectional views of a gear case outer for the embodiment as shown in FIGS. 9 to 13.
Figure 18:
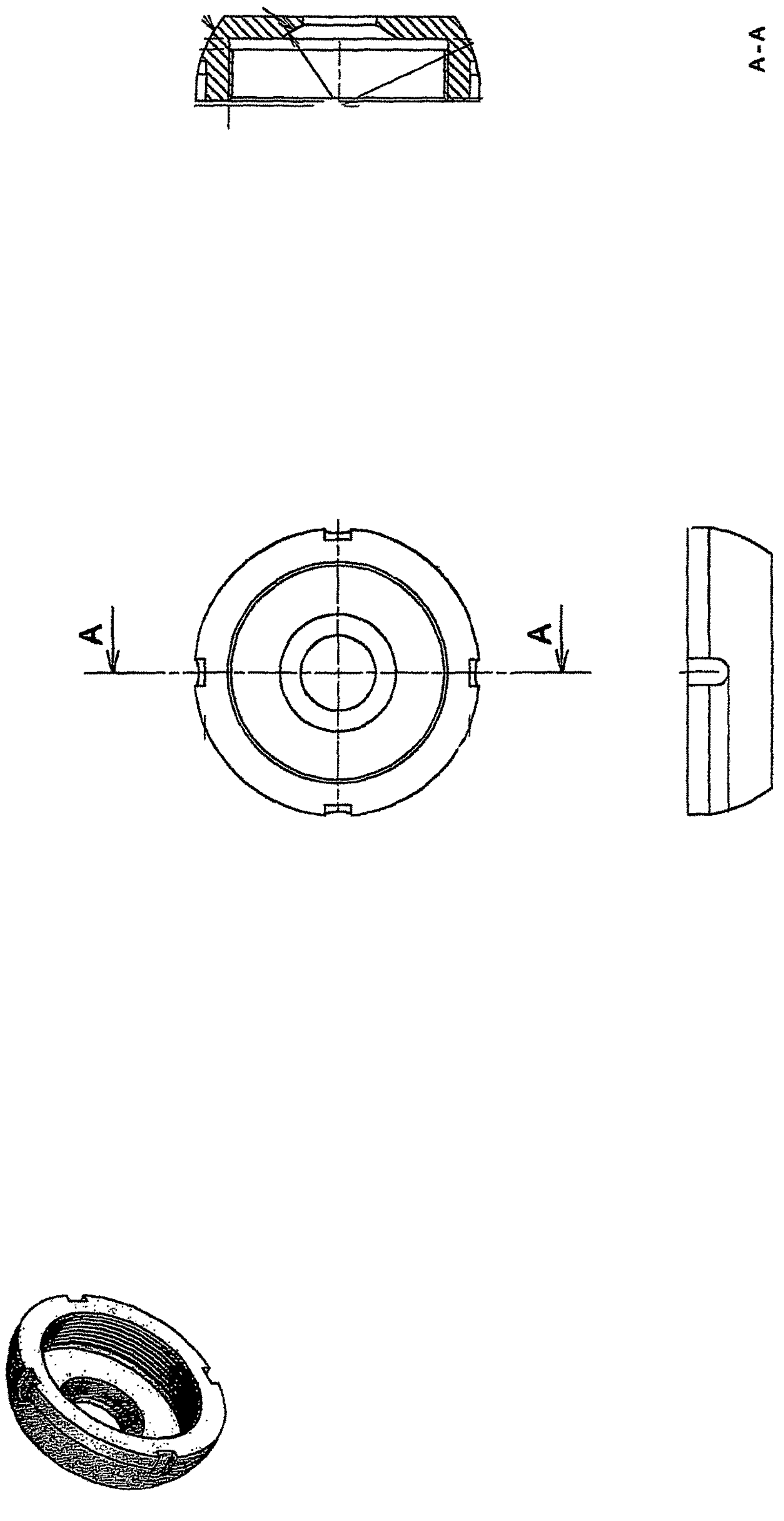
FIG. 18 shows perspective and cross sectional views of a jack top plate pivot base for the embodiment as shown in FIGS. 9 to 13.
Figure 19:
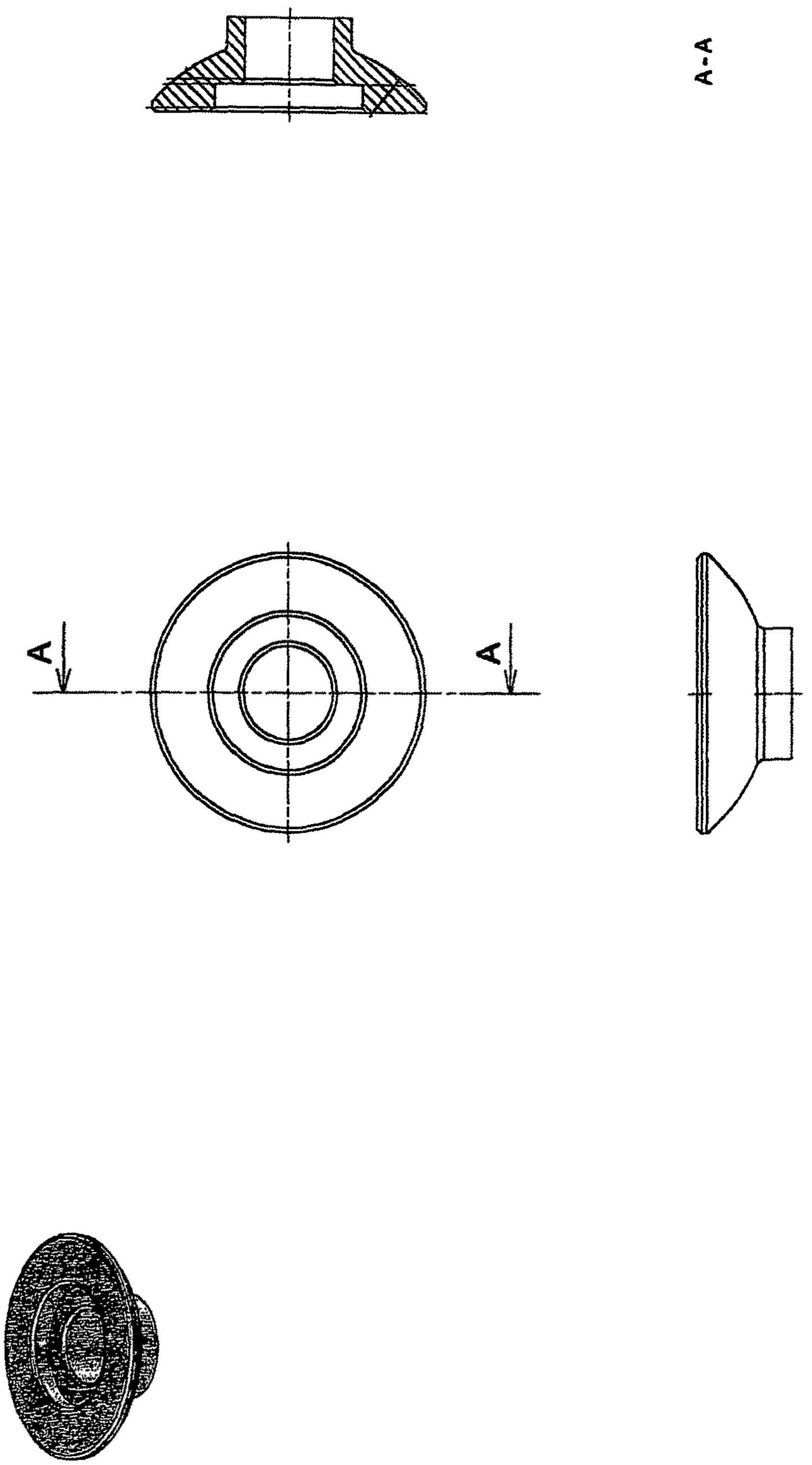
FIG. 19 shows perspective and cross sectional views of a jack top plate pivot spacer for the embodiment as shown in FIGS. 9 to 13.
Figure 20:
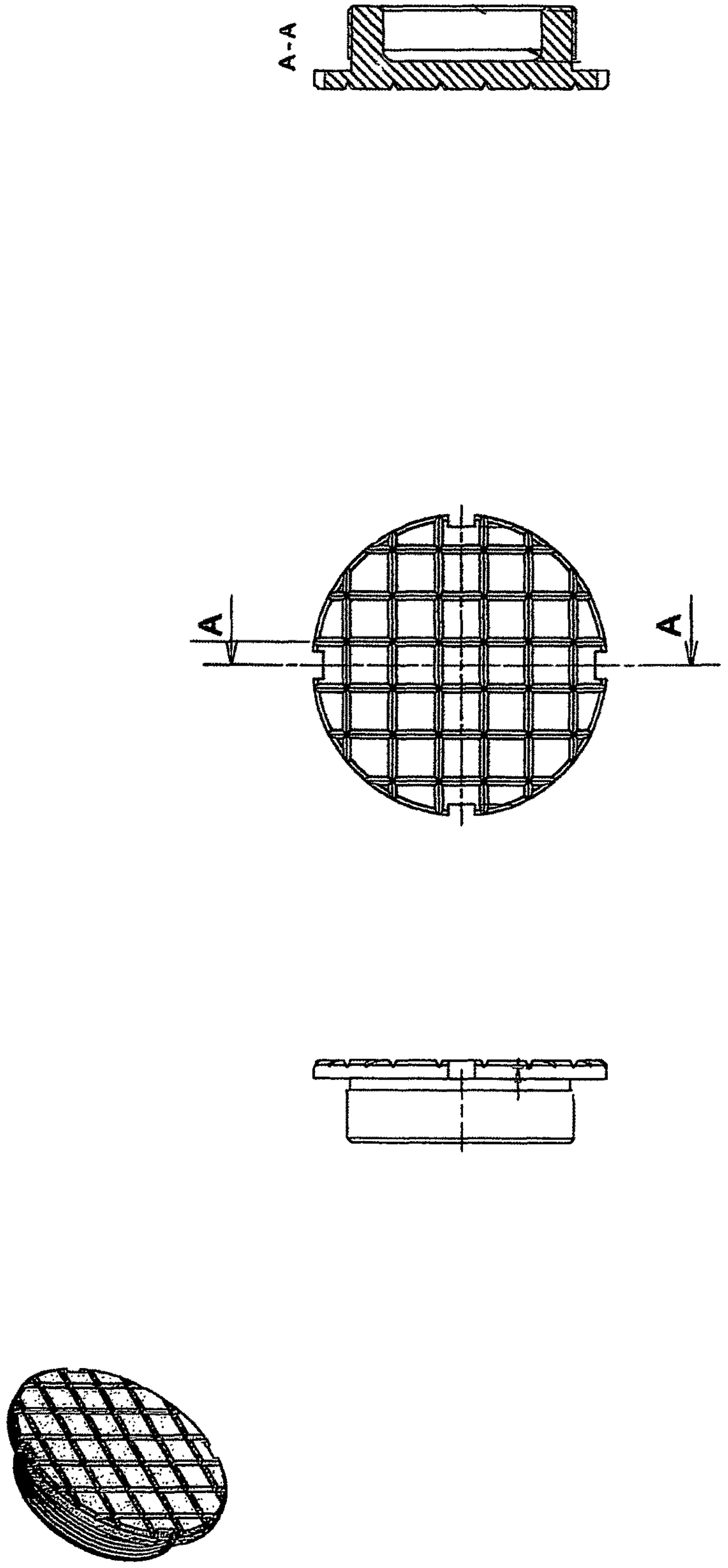
FIG. 20 shows perspective and cross sectional views of a jack top plate pivot top for the embodiment as shown in FIGS. 9 to 13.
Figure 21:
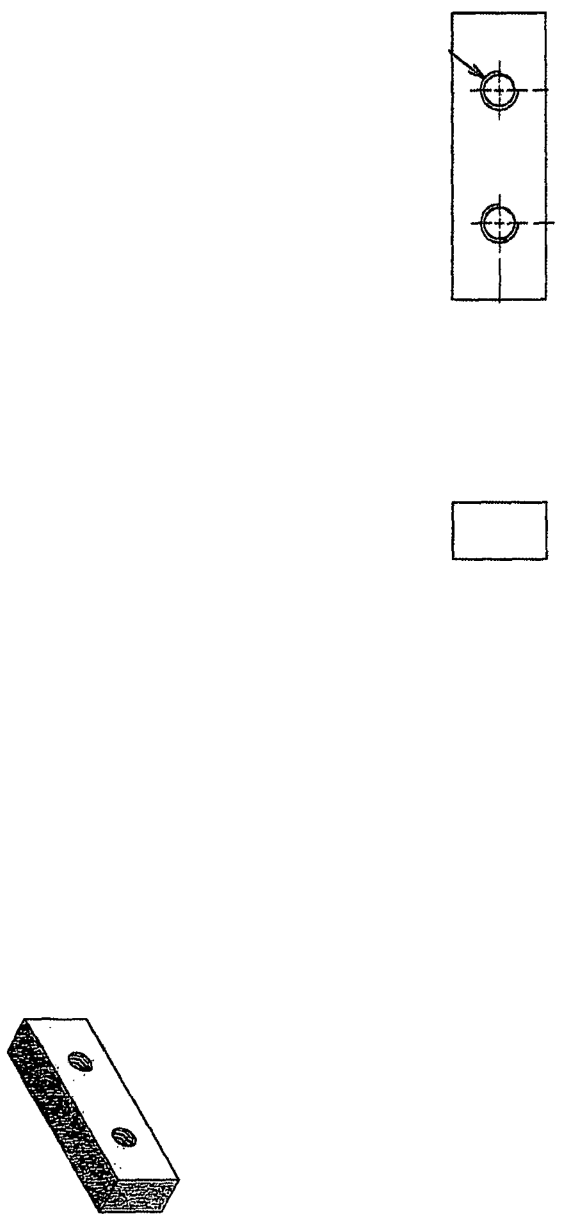
FIG. 21 shows perspective and cross sectional views of a key for the embodiment as shown in FIGS. 9 to 13.
Figure 22:
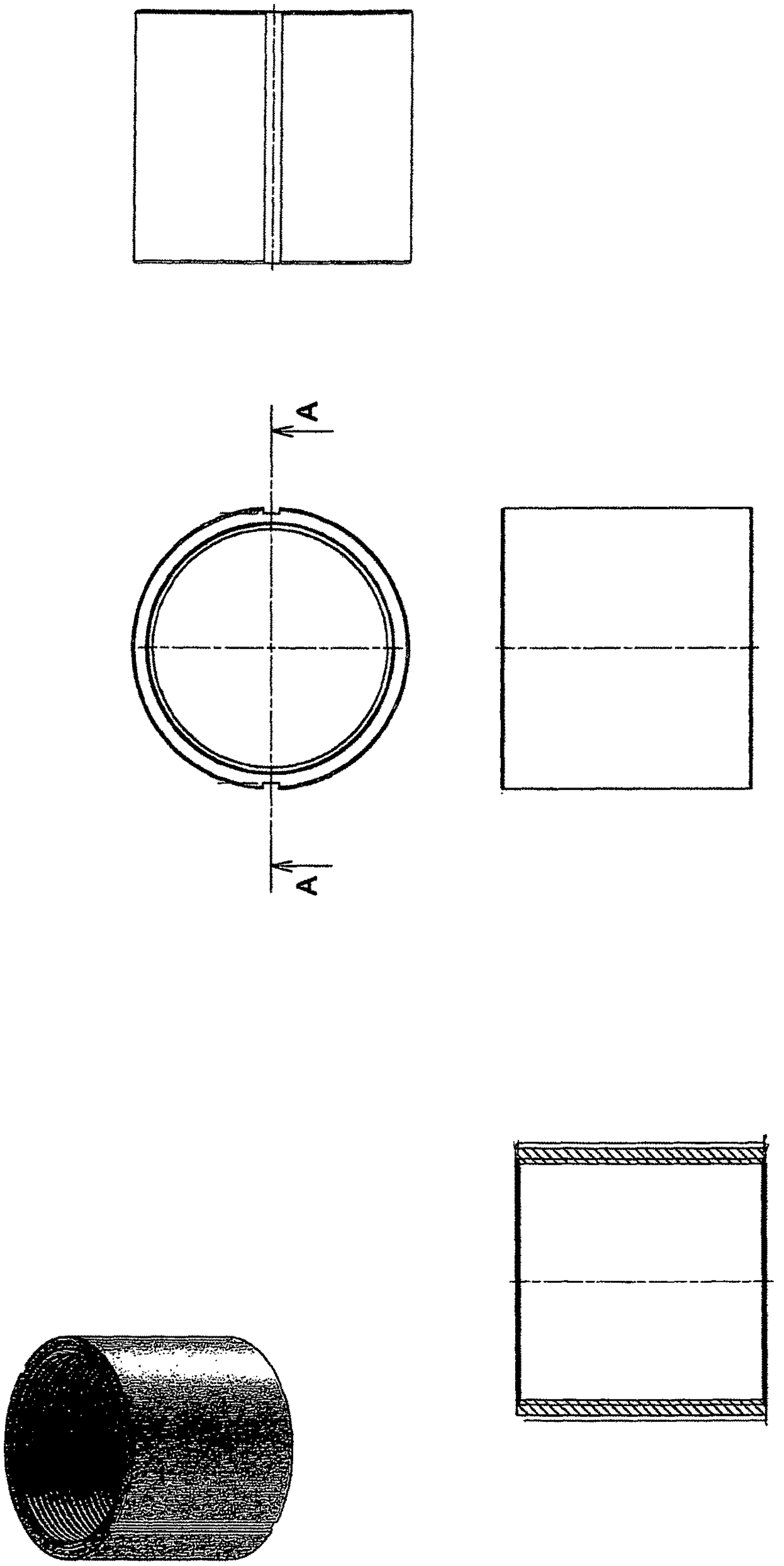
FIG. 22 shows perspective and cross sectional views of a screwed support sleeve for the embodiment as shown in FIGS. 9 to 13.
Figure 23:
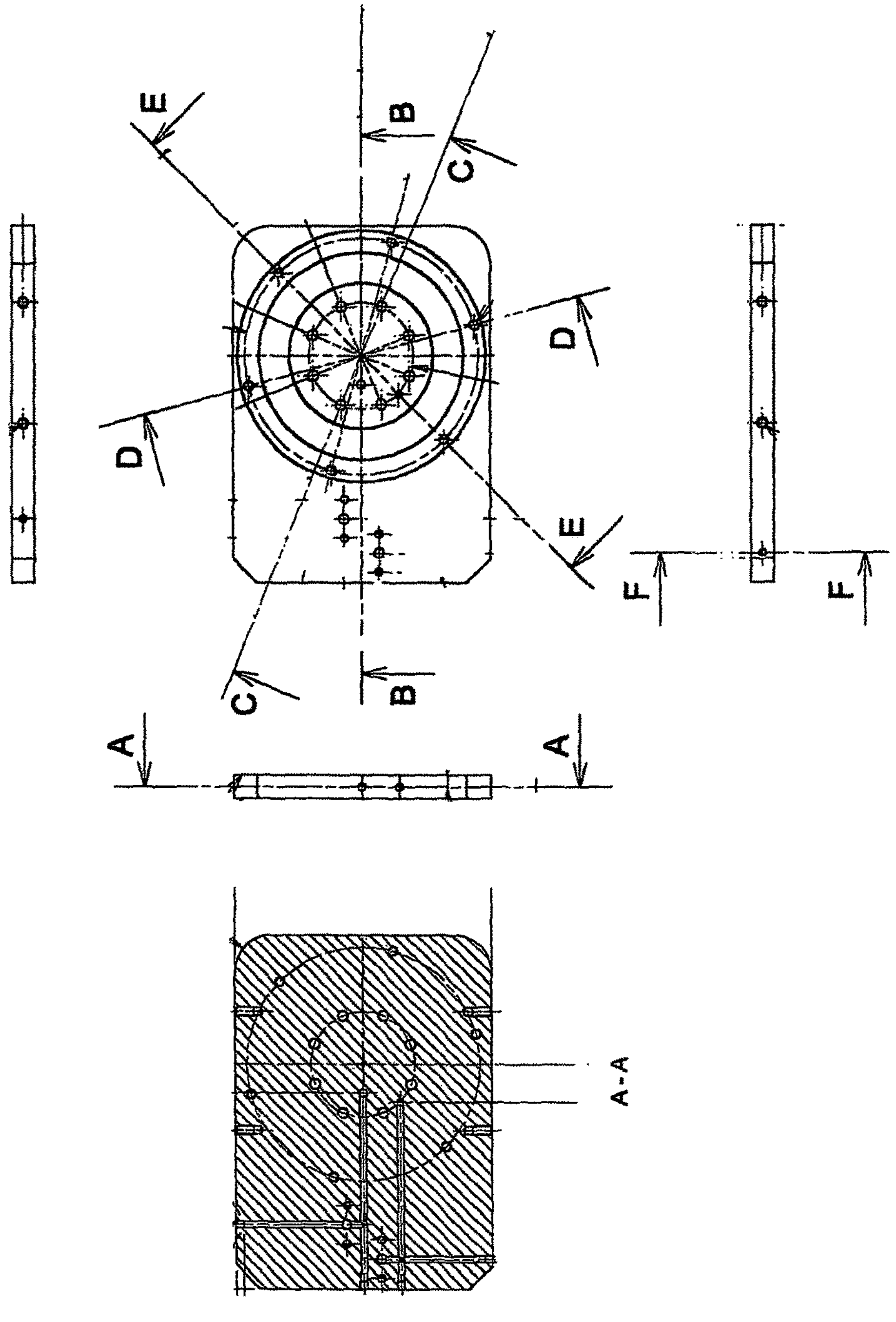
FIG. 23 shows perspective and cross sectional views of a base plate for the embodiment as shown in FIGS. 9 to 13.
Figure 24:
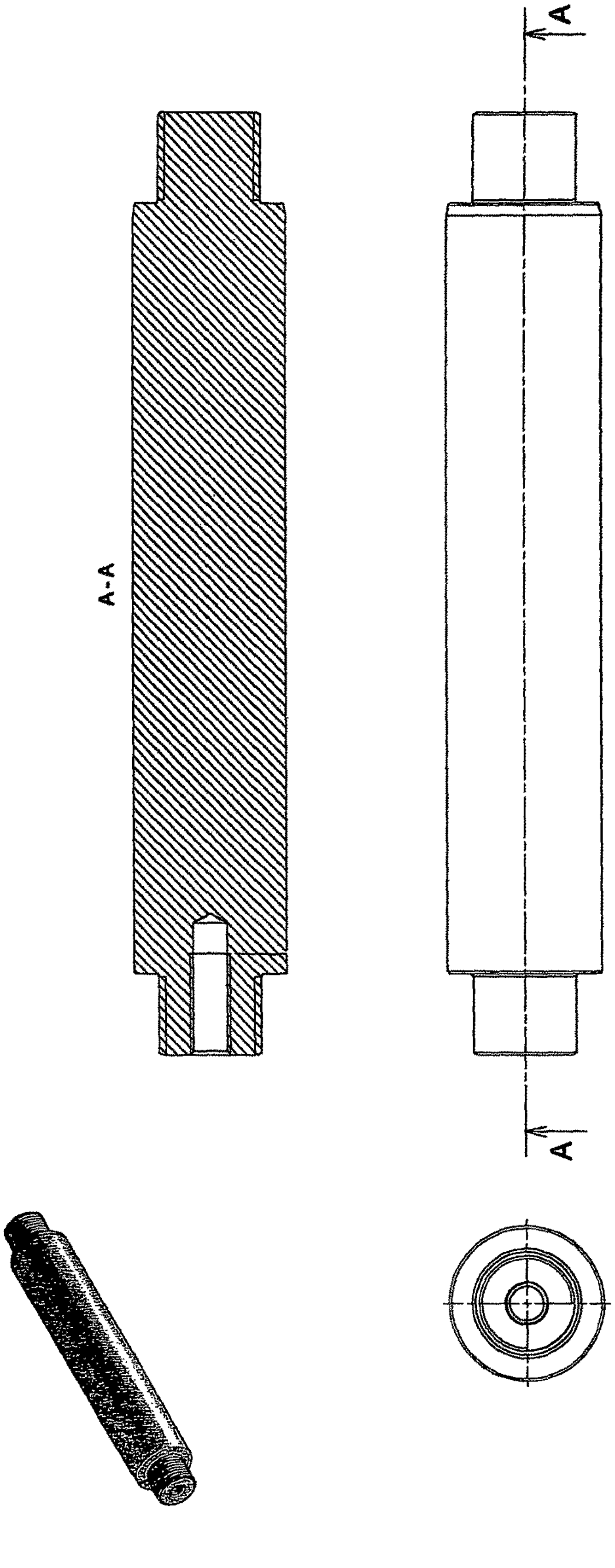
FIG. 24 shows perspective and cross sectional views of a piston rod for the embodiment as shown in FIGS. 9 to 13.
Figure 25:
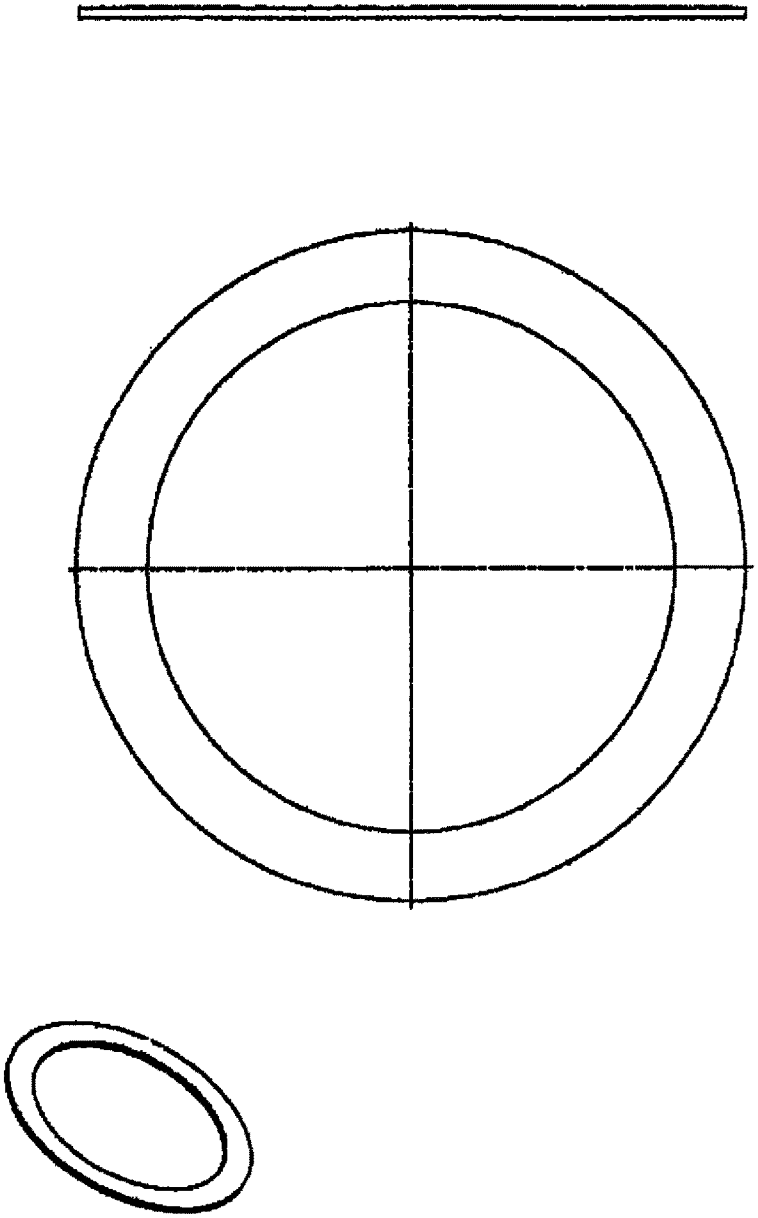
FIG. 25 shows perspective and cross sectional views of a thrust ring for the embodiment as shown in FIGS. 9 to 13.
Figure 26:
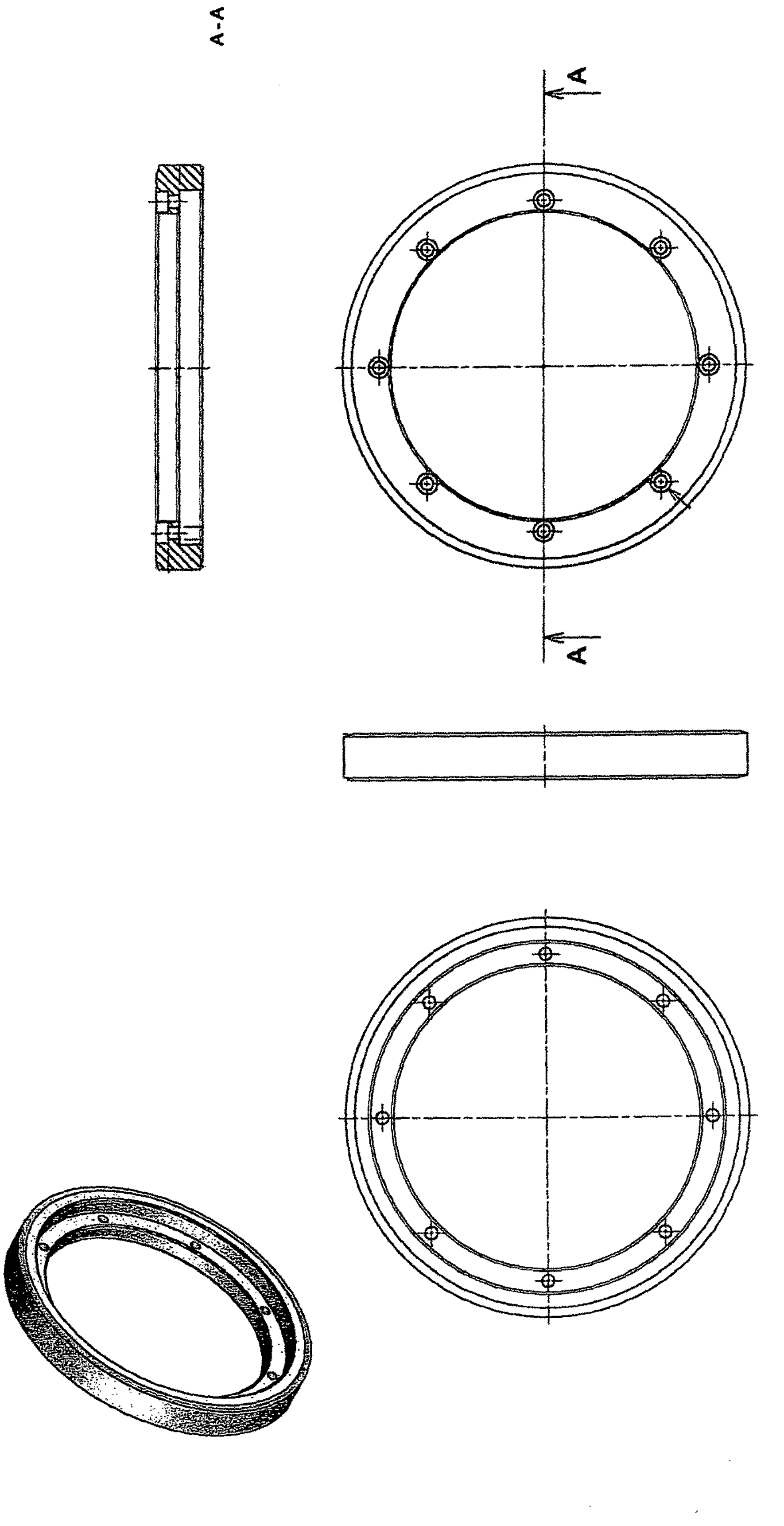
FIG. 26 shows perspective and cross sectional views of a ring gear for the embodiment as shown in FIGS. 9 to 13.
Figure 27:
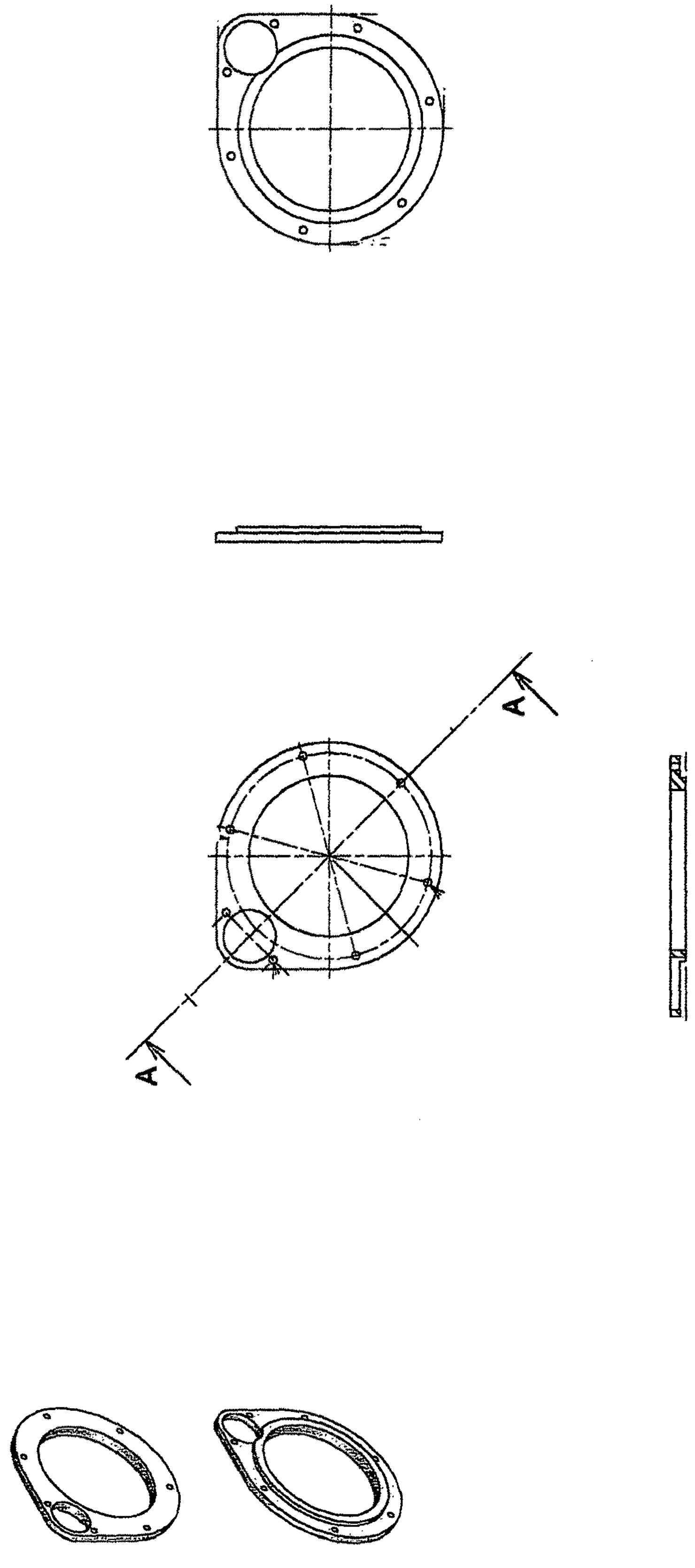
FIG. 27 shows perspective and cross sectional views of a Gear case cover for the embodiment as shown in FIGS. 9 to 13.
Figure 28:
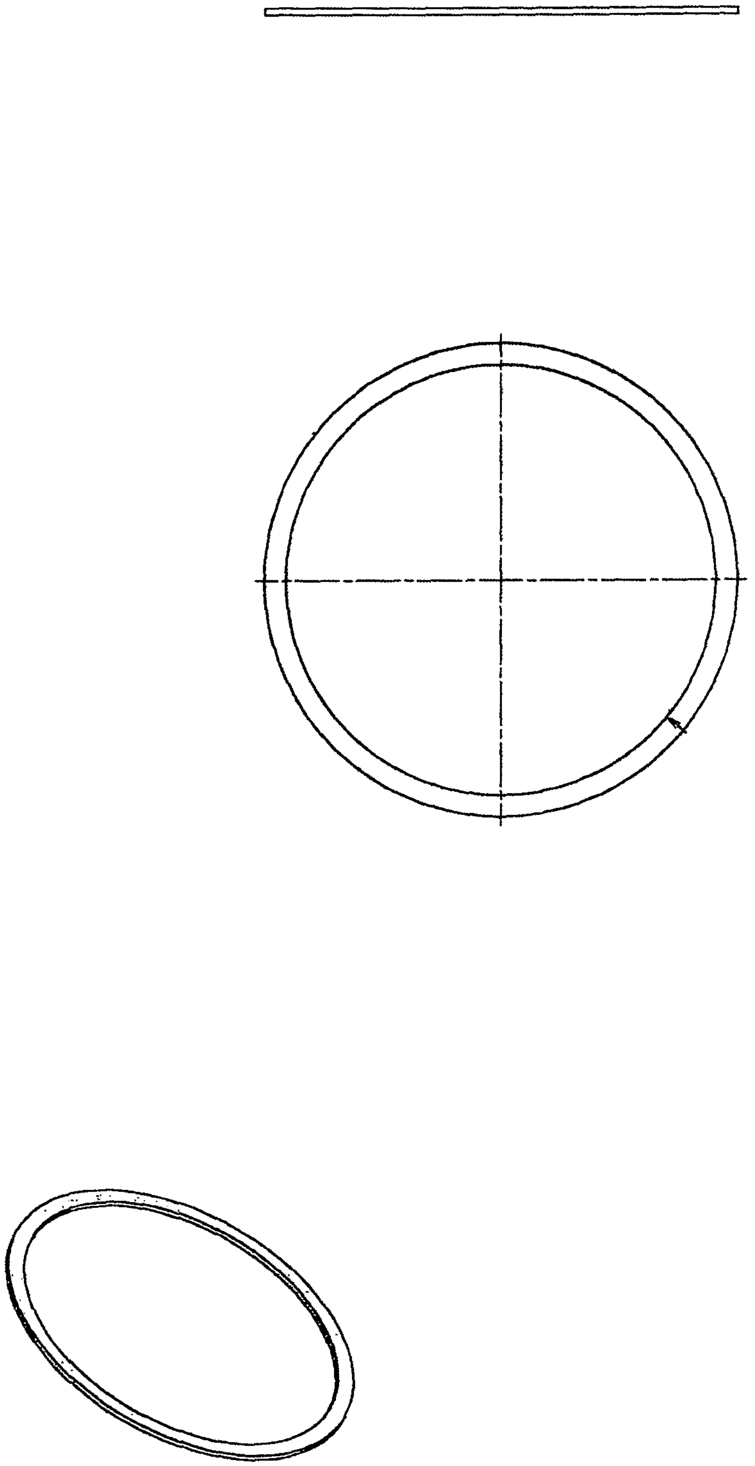
FIG. 28 shows perspective and cross sectional views of a Top thrust ring for the embodiment as shown in FIGS. 9 to 13.
Figure 29:
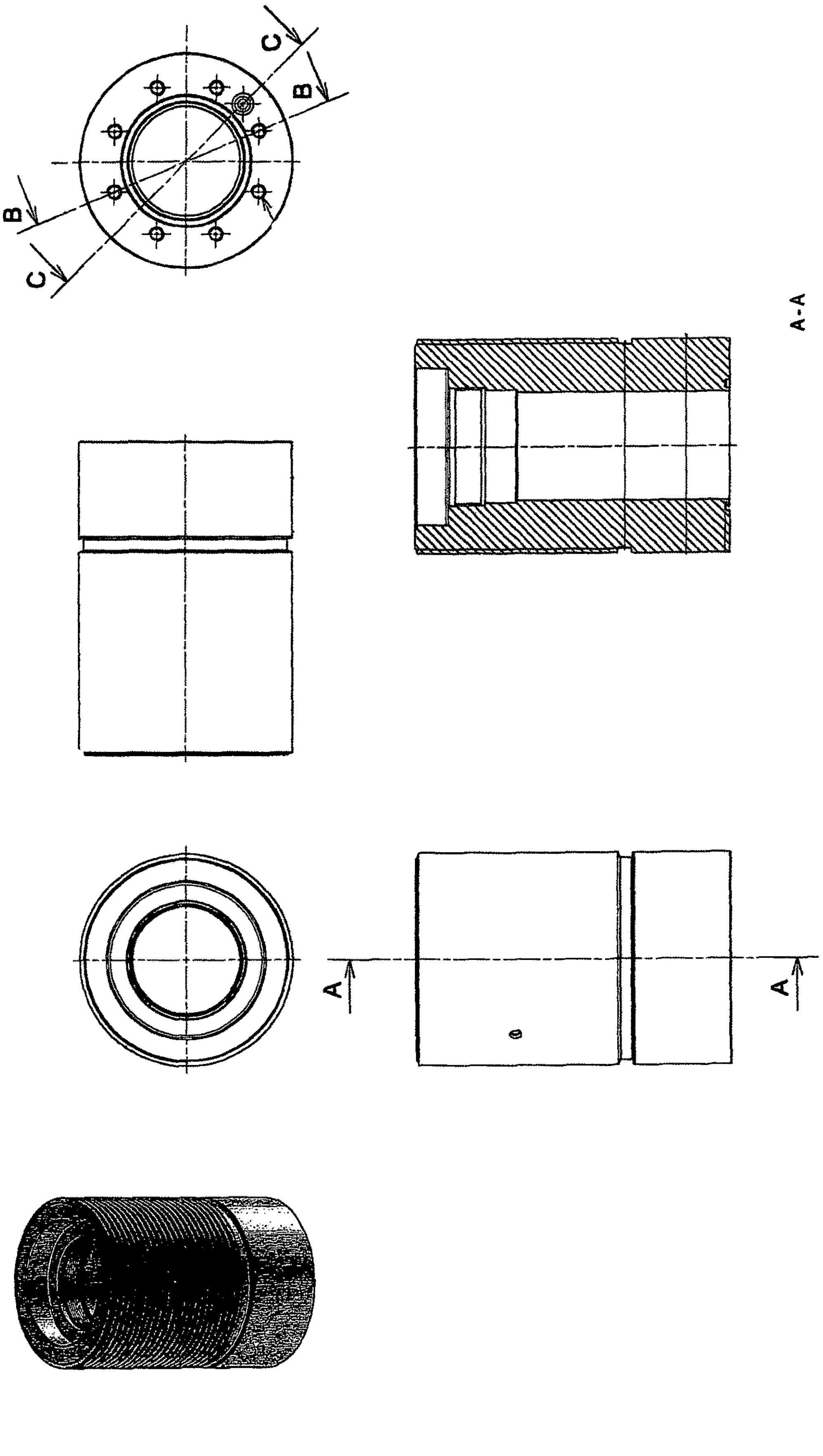
FIG. 29 shows perspective and cross sectional views of a cylinder barrel for the embodiment as shown in FIGS. 9 to 13.
Figure 30:
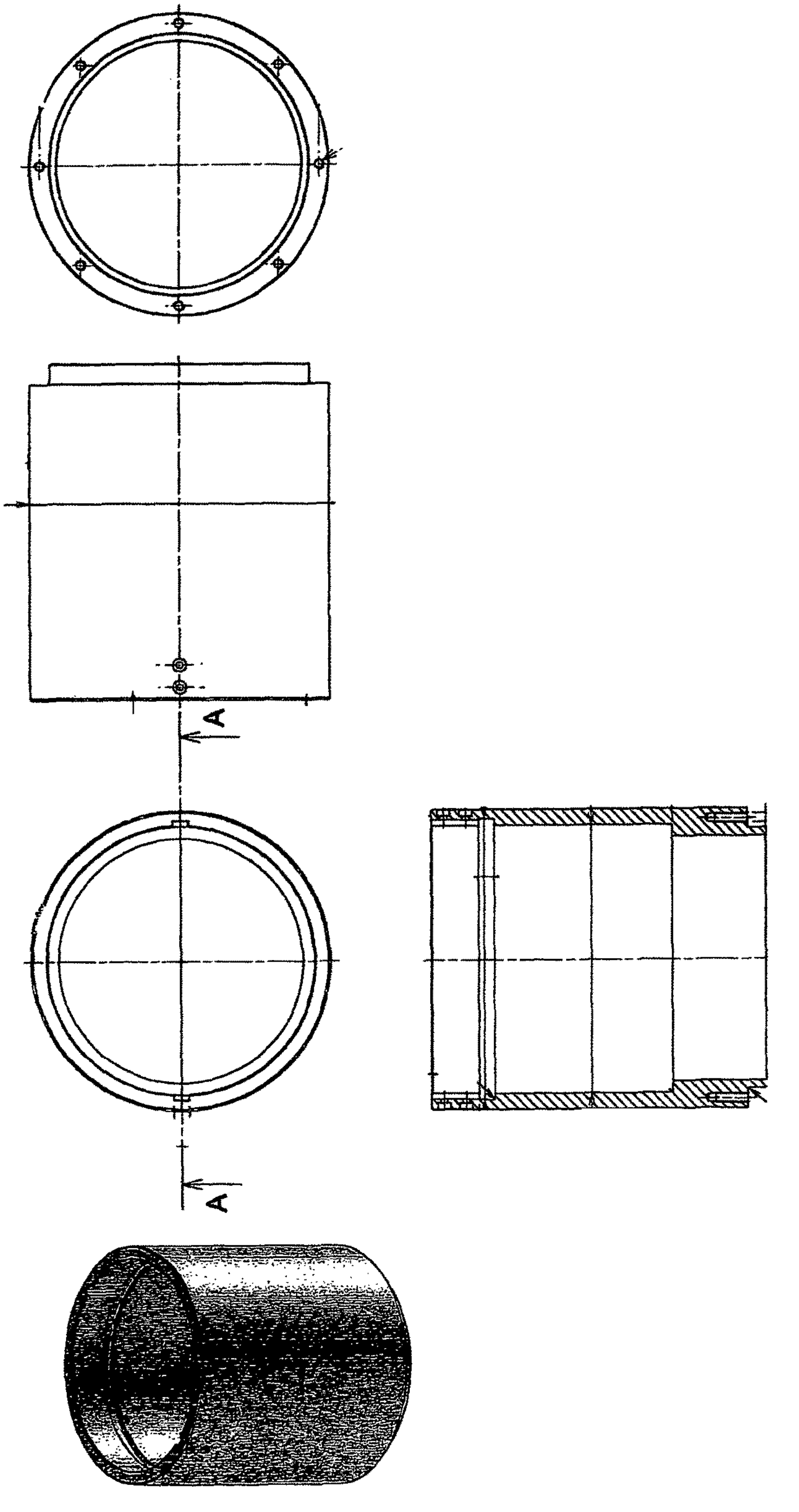
FIG. 30 shows perspective and cross sectional views of a rotator sleeve for the embodiment as shown in FIGS. 9 to 13.
Figure 31:
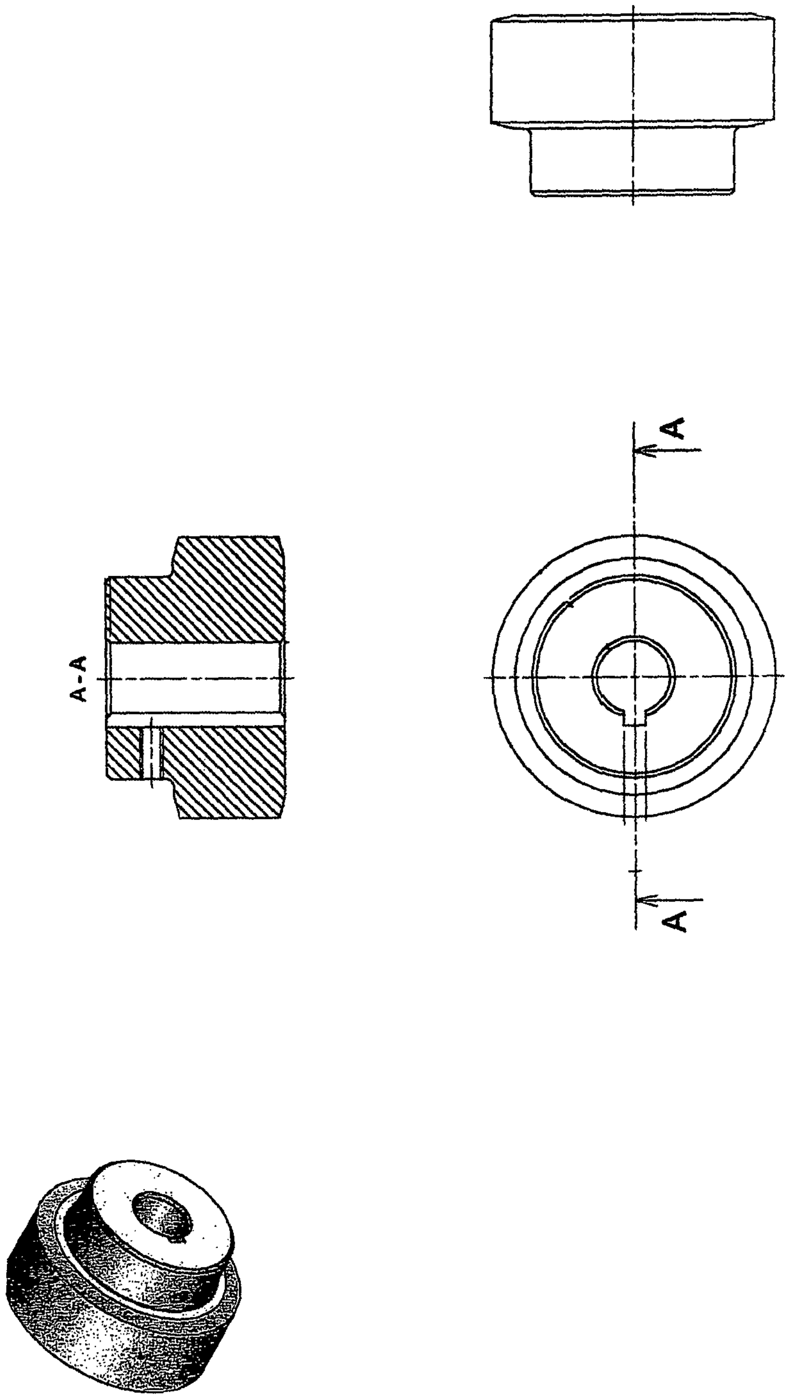
FIG. 31 shows perspective and cross sectional views of a pinion gear for the embodiment as shown in FIGS. 9 to 13.
Figure 32:
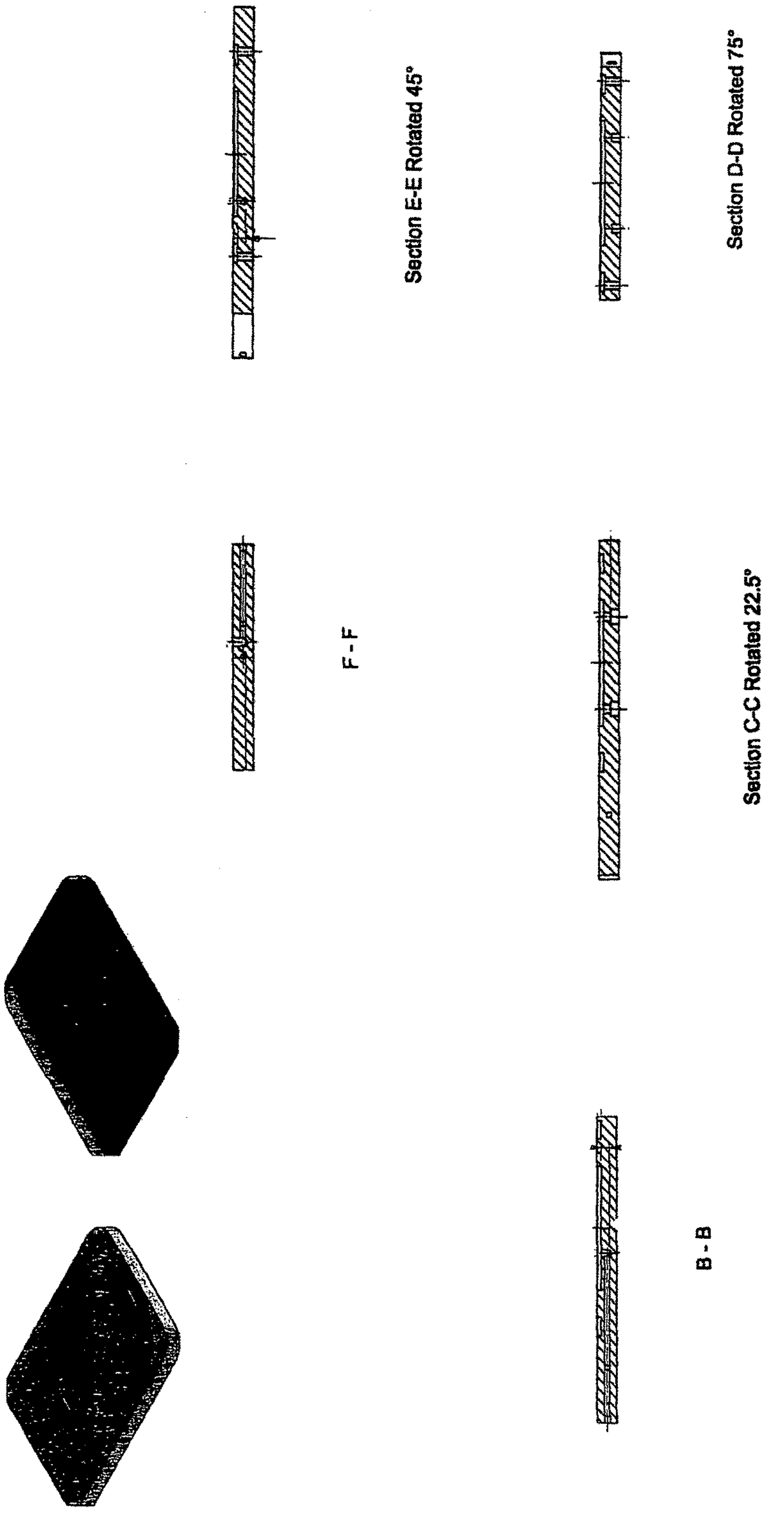
FIG. 32 shows perspective and cross sectional views of a base plate for the embodiment as shown in FIGS. 9 to 13.
Figure 33:
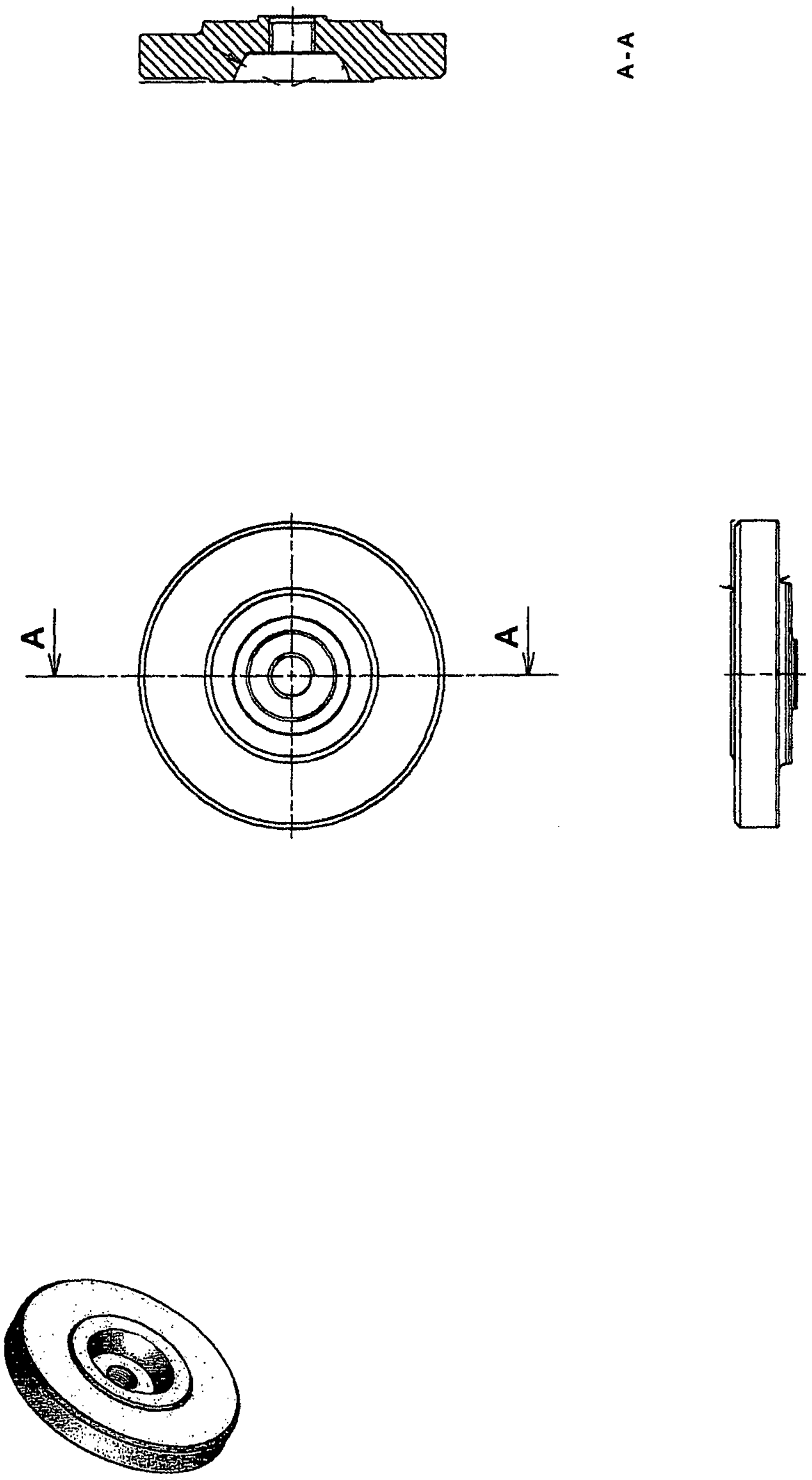
FIG. 33 shows perspective and cross sectional views of a top plate for the embodiment as shown in FIGS. 9 to 13.

It will be appreciated the device may be optionally fitted with its own pump and oil tank, fitted with an axle and wheels for ease of transport and a handle. It will be appreciated that in one variation the oil port may be external to the barrel and may be a movable pipe inward of the machined spiral or thread (See FIG. 8 for example). It will also be appreciated that the hydraulic cylinder may be hollow and may operate at any pressure as required for task.

Figure 34:
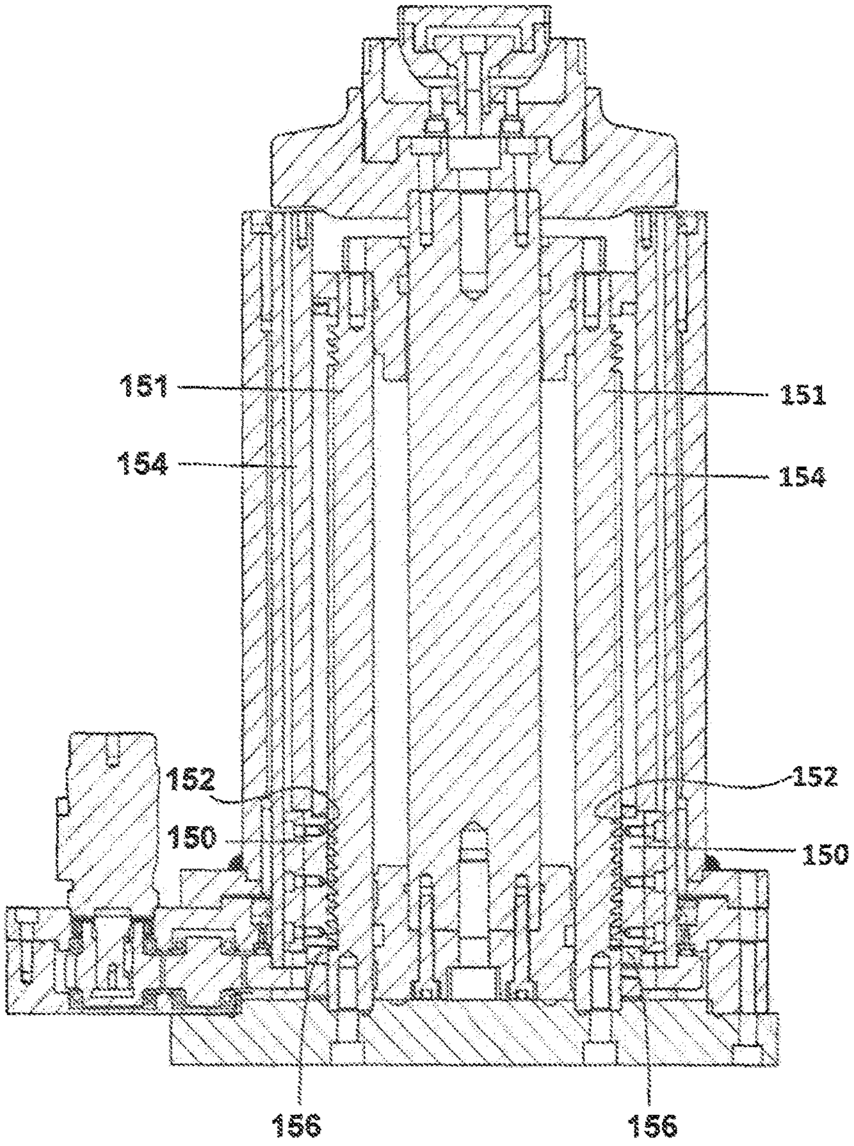
FIGS. 34 and 35 illustrate perspective and cross sectional views of an embodiment of the jacking device where the support member sits on an annular seat member.
Figure 35:
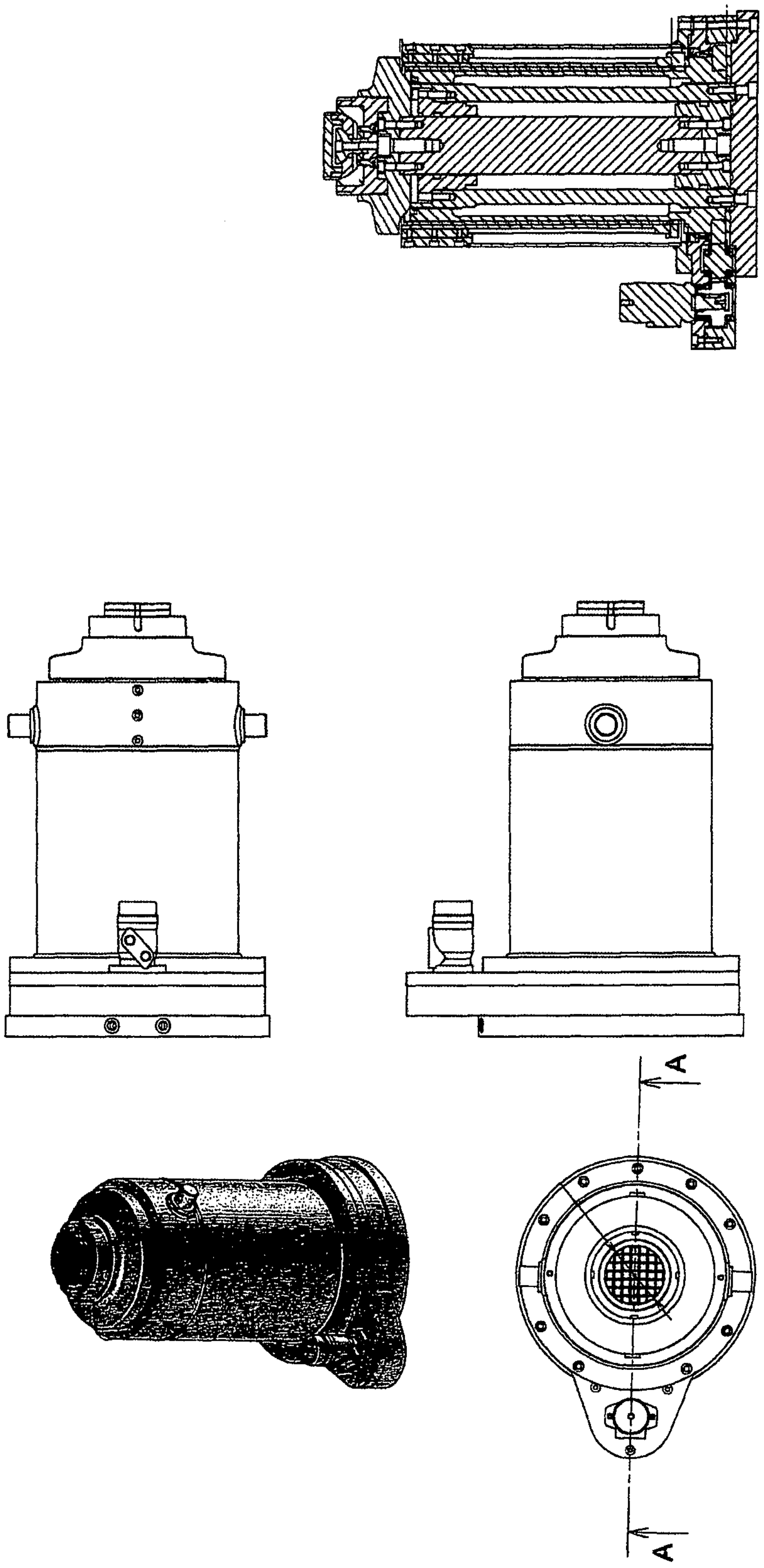

In a further alternate embodiment of the invention, the support sleeve may rest on an annular seat member 150. In such an embodiment it is the seat member (as opposed the support sleeve) which rotatingly engages with the barrel 151 of the jacking leg (or other sleeve/part attached thereto) via threading 152, bearings or otherwise. Rotation of the seat member moves the seat member up/down along the length of the barrel and therefore moves the support sleeve with respect to the barrel, such as, for example, to elevate the support sleeve to meet the top plate. The engagement between the seat member and support sleeve permits the support sleeve to move (i.e. elevate to meet the top plate) without rotating with respect to the barrel. Examples of this embodiment are illustrated in FIGS. 34 and 35. The annular seat member may be formed a nut and/or additional rotary sleeve for example. The motor in this example would be configured to rotate the annular seat member.

A further alternate embodiment has the support sleeve formed of two concentric rotatingly engaged inner and outer cylindrical members. The inner cylindrical member rotatingly engaging with the barrel of the jacking leg (or additional sleeve/part attached thereto) such that the support sleeve as a whole can be moved with respect to the barrel (e.g. elevated to meet the top plate) without the outer cylindrical member rotating with respect to the barrel. The motor in this example would be configured to rotate to the inner cylindrical member, and, the inner cylindrical member may be rotatingly engaged with the barrel by threading, bearings or other appropriate means.

Having the device configured such that the support sleeve (or outer cylindrical member of the support sleeve) does not rotate with respect to the barrel/jacking leg provides several advantages. For example, as the support sleeve (or outer cylindrical member of the support sleeve) does not rotate, less moving parts are exposed to the operator of the jacking device and therefore less there is less likelihood of accidents occurring with the operator. There is less chance of loose clothing or limbs being caught up in the device and therefore these configuration provide significant safety advantages. In addition, these configurations may keep the some or all of the threading (or other means of rotational engagement) substantially protected from picking up dirt or other particles that may interrupt or jam rotation required to elevate the support member.

Figure 7:
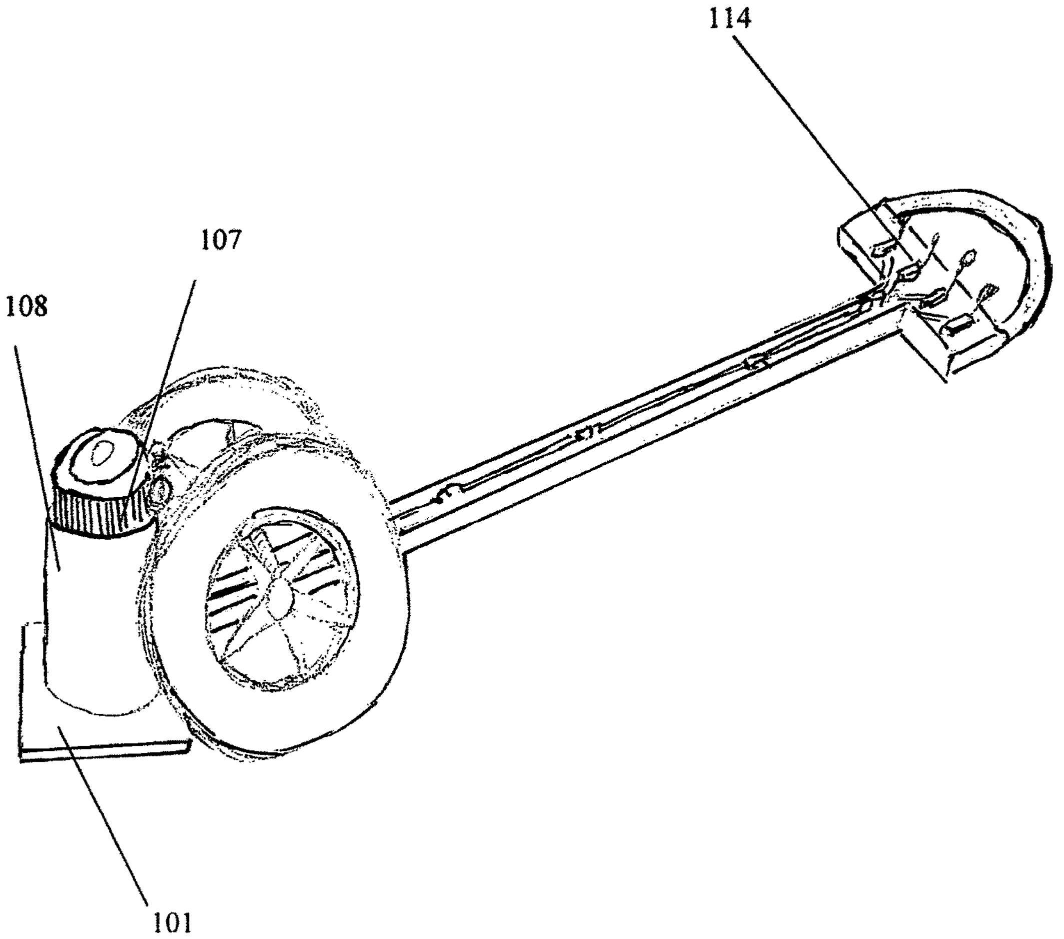
FIG. 7 shows a mobile version of the jacking device fitted with its own pump, oil tank and valves, and also fitted with an axle, wheels, and handle.

All controls (114) and personnel are typically remote of the lift area (see for example FIG. 7). Once lift is finished, inspection can take place to ensure contact between the support sleeve (or other support member) and top plate. The support sleeve is locked into position or "locked out", to prevent unwanted actuation or disengagement from the top plate. It will be appreciated that there may be a range of different mechanisms to mechanically or otherwise lock the support sleeve in position. In one form, the rotatable support sleeve and barrel may include one or more key ways, to provide mechanical stop mechanism 156 for locking the support sleeve in position. Other mechanisms such as stroke limits and/or stroke sensors may also be used to lock the sleeve in position. During operation, oil pressures and/or cylinder strokes can be monitored and/or controlled by the personnel and/or a PLC system.

Typically, the base plate (101) is the common mount point for most components, it generally directly mounts the hydraulic cylinder, outer sleeve, Direction Control Valves (DCV's), and may optionally include a pump, axle and wheels for mobility and a handle (see FIG. 7). The base may also have oil ports pre-drilled.

It will be appreciated that the jacking device in line with any one of the above described embodiments may also be mounted to a trolley such that it can be easily transported and/or manoeuvred beneath a vehicle or other load to be lifted.

The DCV's are typically standard to operational requirements, and may be directly operated by operator, pneumatic or electrical solenoid. Control of DCV's can also be by Programmable logic control (PLC). DCV's may be used to control the speed and direction of the lift cylinder and rotation motor (109). Different relief valves may be used to control pressures in any circuit.

It will also be appreciated that the jacking leg and support member (e.g. sleeve) may be operated by hand, hydraulics, pneumatic means, electric means or any other suitable means.

Furthermore, the jacking device as described herein is not limited for use in the mining industry or for supporting earthmoving equipment of vehicles and may be used in any circumstance where lifting and support a large load is required.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although preferred embodiments have been described in detail, it should be understood that various changes, substitutions, and alterations can be made by one of ordinary skill in the art without departing from the scope of the present invention.

It will be appreciated that various forms of the invention may be used individually or in combination.

PARTS LIST

101 Base Plate
101*a* Porting for barrel end fluid

101*b* Porting for rod end fluid
102 Barrel
102*a* Machined spiral or thread on OD of barrel
102*b* Barrel mount bolts to base plate
102*c* Base seal
102*d* Barrel end oil cavity
103 Barrel cap
103*a* Retaining bolts
103*b* Seals
104 Piston
104*a* Retaining bolts
104*b* Piston seals
105 Rod
105*a* Rod end oil cavity
106 Top plate
106*a* Mount bolts
106*b* Contact plate
107 Screw stand
107*a* ID machined spiral or thread
107*b* OD vertical spline
108 External sleeve
108*a* ID spline
108*b* Ring gear & bearing (option B)
108*c* Retaining bolts (option A)
109 Rotation motor
109*a* Worm gear
109*b* Motor mount bolts
109*c* Fluid entry/exit points
110 DCV
111*a, b* Voids created during extension
112 Oil pipe and fittings for rod end oil flow
113 Pipe cover
113*a* Pipe cover mount bolts
29 M5×10 Hex Soct set screw with cup point ISO 4029-M5-10
28 MB Koenig Expander MB850-070
27 M8×55 Hex Soc Hd Cap Screw ISO 4762
26 MX×30 Hex Soc Hd Cap Screw ISO 4762
25 MX×20 Hex Soc Hd Cap Screw ISO 4762
24 M4×8 Hex Soc Hd Cap Screw
23 M10×40 Hex Soc Hd Cap Screw ISO 4762
22 M10×30 Hex Soc Hd Cap Screw ISO 4762
21 Plain washer ISO 7091-10
20 Composite Bush
19 Maxma hydraulic motor
18 Valve counterbalance
17 Balance Valve Body
16 Jack Lifting Plate
15 Pinion Gear
14 Jack Top Plate
13 Key
12 Top Plate Pivot Sub-Assy
11 Cylinder Gland
10 Top Thrust ring
9 Thrust ring
8 Ring Gear
7 Gear Case Cover
6 Gear Case Outer
5 Rotator Sleeve
4 Screwed Sleeve
3 Cylinder Barrel
2 Piston and Rod Sub-Assy
1 Jack Base Plate
203 Jack Top Plate Pivot Spacer
202 Jack Top Plate Pivot Top
201 Jack Top Plate Pivot Base
204 Piston Lock Nut

205 Piston

206 Piston Rod

The claims defining the invention are as follows:

1. A jacking device for lifting and supporting, the jacking device comprising:

a base;

a hydraulic or pneumatic cylinder including a barrel portion and a rod portion, the barrel portion being mounted to the base and the rod portion being extendable from within the barrel portion to extend the jacking device;

a top plate mounted at its underside to the rod portion;

an annular seat member rotatably engaged to the barrel portion; and a support member movable toward or away from the top plate with rotation of the annular seat member, the support member being positionable to engage the underside of the top plate, wherein the rod portion is movable between a retracted position and an extended position, and wherein, in the extended position, the support member is positionable to be between and in contact with the top plate and the annular seat member such that the rod portion is mechanically maintained in the extended position.

2. The jacking device as claimed in claim 1, wherein the support member is a cylindrical support sleeve fitted around the hydraulic or pneumatic cylinder.

3. The jacking device as claimed in claim 2, wherein at least part of the cylindrical support sleeve is fitted around the barrel portion.

4. The jacking device as claimed in claim 1, wherein the support member sits on, or is mounted on or to, the annular seat member.

5. The jacking device as claimed in claim 1, wherein the top plate is disc shaped.

6. The jacking device as claimed in claim 2, wherein the diameter of the cylindrical support sleeve is less than or equal to the diameter of the top plate.

7. The jacking device as claimed in claim 1, further including an outer sleeve mounted to the base.

8. The jacking device as claimed in claim 1, further including a motor configured to rotate the annular seat member.

9. The jacking device as claimed in claim 1, wherein the annular seat member is a nut.

10. The jacking device as claimed in claim 1, wherein the annular seat member is shaped as a cylindrical sleeve.

11. The jacking device as claimed in claim 1, wherein the annular seat member is threadedly engaged to the barrel portion.

12. The jacking device as claimed in claim 8, wherein the annular seat member includes a nut and rotary sleeve, and the motor rotates the nut via rotation of the rotary sleeve.

13. The jacking device as claimed in claim 11, wherein the annular seat member includes at least one mechanical rotation stop to stop rotation and therefore movement of the annular seat member beyond upper or lower limit positions on the barrel portion.

14. The jacking device as claimed in claim 8, wherein the motor is hydraulically, electrically or pneumatically powered.

* * * * *